US009520029B2

(12) United States Patent
Guinn

(10) Patent No.: US 9,520,029 B2
(45) Date of Patent: Dec. 13, 2016

(54) WAGERING GAME MACHINE HAVING ENHANCED ELIGIBILITY FOR PROGRESSIVE JACKPOTS

(71) Applicant: WMS Gaming Inc., Waukegan, IL (US)

(72) Inventor: Andrew Guinn, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 230 days.

(21) Appl. No.: 14/471,364

(22) Filed: Aug. 28, 2014

(65) Prior Publication Data

US 2016/0063817 A1 Mar. 3, 2016

(51) Int. Cl.
*G06F 17/00* (2006.01)
*G07F 17/32* (2006.01)

(52) U.S. Cl.
CPC .................................. *G07F 17/3258* (2013.01)

(58) Field of Classification Search
USPC ........................................................ 463/16–25
See application file for complete search history.

(56) References Cited

U.S. PATENT DOCUMENTS

| | | | | |
|---|---|---|---|---|
| 6,517,433 | B2 | 2/2003 | Loose et al. | 463/20 |
| 7,316,610 | B2 | 1/2008 | Seelig et al. | 463/17 |
| 7,494,414 | B2 | 2/2009 | Hedrick et al. | 463/20 |
| 7,563,165 | B2 | 7/2009 | Seelig et al. | 463/20 |
| 8,784,193 | B2 * | 7/2014 | Anderson | G07F 17/323 463/25 |
| 2003/0155715 | A1 | 8/2003 | Walker et al. | 273/292 |
| 2004/0224755 | A1 | 11/2004 | Tallal, Jr. | 463/25 |
| 2005/0215314 | A1 | 9/2005 | Schneider et al. | 463/26 |
| 2006/0035706 | A1 | 2/2006 | Thomas et al. | 463/27 |
| 2006/0068878 | A1 | 3/2006 | Krenn et al. | 463/17 |
| 2006/0252501 | A1 | 11/2006 | Little et al. | 463/25 |
| 2007/0001398 | A1 | 1/2007 | Walker et al. | 273/292 |
| 2007/0060287 | A1 | 3/2007 | Reddicks et al. | 463/19 |
| 2007/0077978 | A1 | 4/2007 | Walker et al. | 463/16 |
| 2007/0135193 | A1 | 6/2007 | Nicely | 463/11 |

(Continued)

FOREIGN PATENT DOCUMENTS

| | | | | |
|---|---|---|---|---|
| WO | WO 2006/014990 A2 | 2/2006 | | A63F 9/24 |
| WO | WO 2006/130611 A2 | 12/2006 | | A63F 9/24 |
| WO | WO 2008/133849 A1 | 11/2008 | | G07F 17/32 |

OTHER PUBLICATIONS

Mills, J. et al., "The Spanish Springs Casino Slot Revenue Recognition Case," Global Perspectives on Accounting Education, vol. 2, pp. 99-111 (2005) (13 pages).

(Continued)

*Primary Examiner* — Ronald Laneau
(74) *Attorney, Agent, or Firm* — Marc D. Thompson

(57) ABSTRACT

A gaming system includes game logic circuitry for a wagering game which awards one or more progressive jackpots upon the occurrence of a progressive jackpot triggering event. The game logic circuitry also operates the wagering game to grant progressive jackpot eligibility for one or more progressive jackpot awards for a player wagering an amount which would otherwise deny the player eligibility for the one or more of the progressive jackpot awards. As a result of maintaining progressive jackpot eligibility with the reduced wagering amount, one or more winning combinations in the pay table of the wagering game are removed or reduced.

20 Claims, 17 Drawing Sheets

(56) References Cited

U.S. PATENT DOCUMENTS

| | | | | |
|---|---|---|---|---|
| 2007/0135204 | A1 | 6/2007 | Nicely | 463/17 |
| 2007/0202947 | A1 | 8/2007 | Seelig et al. | 463/30 |
| 2007/0259709 | A1 | 11/2007 | Kelly et al. | 463/20 |
| 2007/0259711 | A1 | 11/2007 | Thomas | 463/22 |
| 2008/0032782 | A1 | 2/2008 | Boesen et al. | 463/20 |
| 2008/0064501 | A1 | 3/2008 | Patel | 463/40 |
| 2008/0102919 | A1 | 5/2008 | Rowe et al. | 463/18 |
| 2008/0182643 | A1 | 7/2008 | Seelig et al. | 463/20 |
| 2008/0248844 | A1 | 10/2008 | Gadda et al. | 463/1 |
| 2008/0272544 | A1 | 11/2008 | Schwartz | 273/274 |
| 2008/0274783 | A1 | 11/2008 | Walker et al. | 463/13 |
| 2009/0124351 | A1 | 5/2009 | Dewaal et al. | 463/25 |
| 2009/0124384 | A1 | 5/2009 | Smith et al. | 463/42 |
| 2009/0305777 | A1 | 12/2009 | Anderson | 463/27 |
| 2009/0325681 | A1 | 12/2009 | Engleman et al. | 463/20 |
| 2010/0069160 | A1 | 3/2010 | Barrett et al. | 463/46 |
| 2010/0087246 | A1 | 4/2010 | Ward | 463/27 |
| 2010/0124989 | A1 | 5/2010 | Englman et al. | 463/27 |
| 2010/0133752 | A1 | 6/2010 | Ko | 273/292 |
| 2010/0234099 | A1 | 9/2010 | Rasmussen et al. | 463/29 |
| 2012/0289322 | A1 | 11/2012 | Causley | 463/26 |
| 2013/0084926 | A1* | 4/2013 | Davis | G07F 17/32 463/1 |
| 2013/0084955 | A1* | 4/2013 | Davis | G07F 17/32 463/25 |
| 2013/0084956 | A1* | 4/2013 | Davis | G07F 17/32 463/25 |
| 2013/0084957 | A1* | 4/2013 | Davis | G07F 17/3262 463/25 |
| 2013/0084958 | A1* | 4/2013 | Davis | G07F 17/3239 463/25 |

OTHER PUBLICATIONS

Oses, N. et al., "Hitting the Jackpot with O.R.," OR Insight, vol. 19, Issue 3, pp. 21-30 (2006)(10 pages).

Lamb, Charles, "Types of Gaming: Game Formats and Their Online Versions," Internet Gaming Law, pp. 27-70 (2006) (44 pages).

* cited by examiner

700

VIDEO POKER PAY TABLE:

790 CHANGE WIN THE PROGRESSIVE JACKPOT PLAYING FIVE COINS!

| | | | | | |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 2 | 4 | 6 | 8 | 10 |
| JACKS OR BETTER | 1 | 2 | 3 | 4 | 5 |

FIG. 7A

WAGERING GAME MACHINE HAVING ENHANCED ELIGIBILITY FOR PROGRESSIVE JACKPOTS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus, and methods for playing wagering games, and more particularly, to a gaming system having an enhanced determination of eligibility for progressive awards.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Therefore, there is a continuing need for gaming machine manufacturers to continuously develop new games and improved gaming enhancements that will attract frequent play through enhanced entertainment value to the player.

One way to enhance the entertainment value of a wagering game is to provide a gaming system having progressive awards which may be funded by a portion of wagers received into the system for play of wagering games. To ensure perceived equality and fairness, a gaming system, as described herein, may include accounting and funding mechanisms which permit players wagering different amounts on primary wagering games to be eligible for progressive awards. Thus, the present invention is directed to a gaming system having multiple wager levels which effect eligibility for progressive jackpot awards and available winning combinations.

SUMMARY OF THE INVENTION

According to one aspect of the present invention, a gaming system comprises one or more input devices, one or more display devices, and game-logic circuitry comprising one or more processors and one or more memory devices. The gaming system is configured to provide enhanced eligibility for a progressive jackpot in a wagering game. The wagering game has a plurality of payout possibilities and a defined default minimum wager amount that qualifies a player for the progressive jackpot. The one or more memory devices store instructions that, when executed by the one or more processors, cause the game-logic circuitry to configure the gaming system to perform various processes. The gaming system acts to receive, via at least one of the one or more input devices, a request from the player to determine a modified minimum wager amount. The modified minimum wager amount is less than the default minimum wager amount. The gaming system reduces one or more payout possibilities of the plurality of payout possibilities of the wagering game. In response to reducing the one or more payout possibilities, the gaming system designates the modified minimum wager amount as qualifying for the progressive jackpot in the wagering game. The gaming system then receives, from at least one of the one or more input devices, an input from the player indicative of a wager of the modified minimum wager amount to initiate the wagering game. The wagering game is then conducted with the player being qualified for the progressive jackpot at the modified minimum wager amount.

According to another aspect of the invention, a computer-implemented method in a gaming system comprises game-logic circuitry including one or more processors and one or more memory devices. The gaming system is configured to conduct a wagering game having having a plurality of payout possibilities. The wagering game also has a default minimum wager amount that qualifies a player for a progressive jackpot. The method includes receiving, via at least one of one or more input devices, a request from the player to determine a modified minimum wager amount, wherein the modified minimum wager amount is less than the default minimum wager amount. The method further includes reducing, via at least one of the one or more processors, one or more payout possibilities of the plurality of payout possibilities. In response to reducing the one or more payout possibilities, the method designates, via at least one of the one or more processors, the modified minimum wager amount as qualifying for the progressive jackpot in the wagering game. The method further includes receiving, via at least one of the one or more input devices, an input from the player indicative of a wager of the modified minimum wager amount to initiate the wagering game, and in response, conducting the wagering game with the player being qualified for the progressive jackpot at the modified minimum wager amount.

According to one aspect of the present invention, a gaming system comprises one or more input devices, one or more display devices, and game-logic circuitry comprising one or more processors and one or more memory devices. The gaming system is configured to provide enhanced eligibility for a progressive jackpot in a wagering game. The one or more memory devices store instructions that, when executed by the one or more processors, cause the game-logic circuitry to perform specifics functions. Among these, the gaming system acts to display, via at least one of the one or more display devices, an initial game screen of the wagering game including a wager-modifying selector. In response to receiving, via at least one of the one or more input devices, an input from a player indicative of a first wager amount, conduct the wagering game with the player being qualified for the progressive jackpot at the first wager amount. In response to receiving, via the wager-modifying selector, a request from the player to wager less than the first wager amount and remain qualified for the progressive jackpot, the gaming system reduces one or more payout possibilities of the wagering game, designates a modified wager amount as qualifying for the progressive jackpot in the wagering game, and conducts the wagering game with the player being qualified for the progressive jackpot at the modified wager amount.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIGS. 7A-7B are depictions of a video poker wagering game performing assignment of progressive jackpot eligibility in accordance with one embodiment of the invention.

Figure 1:
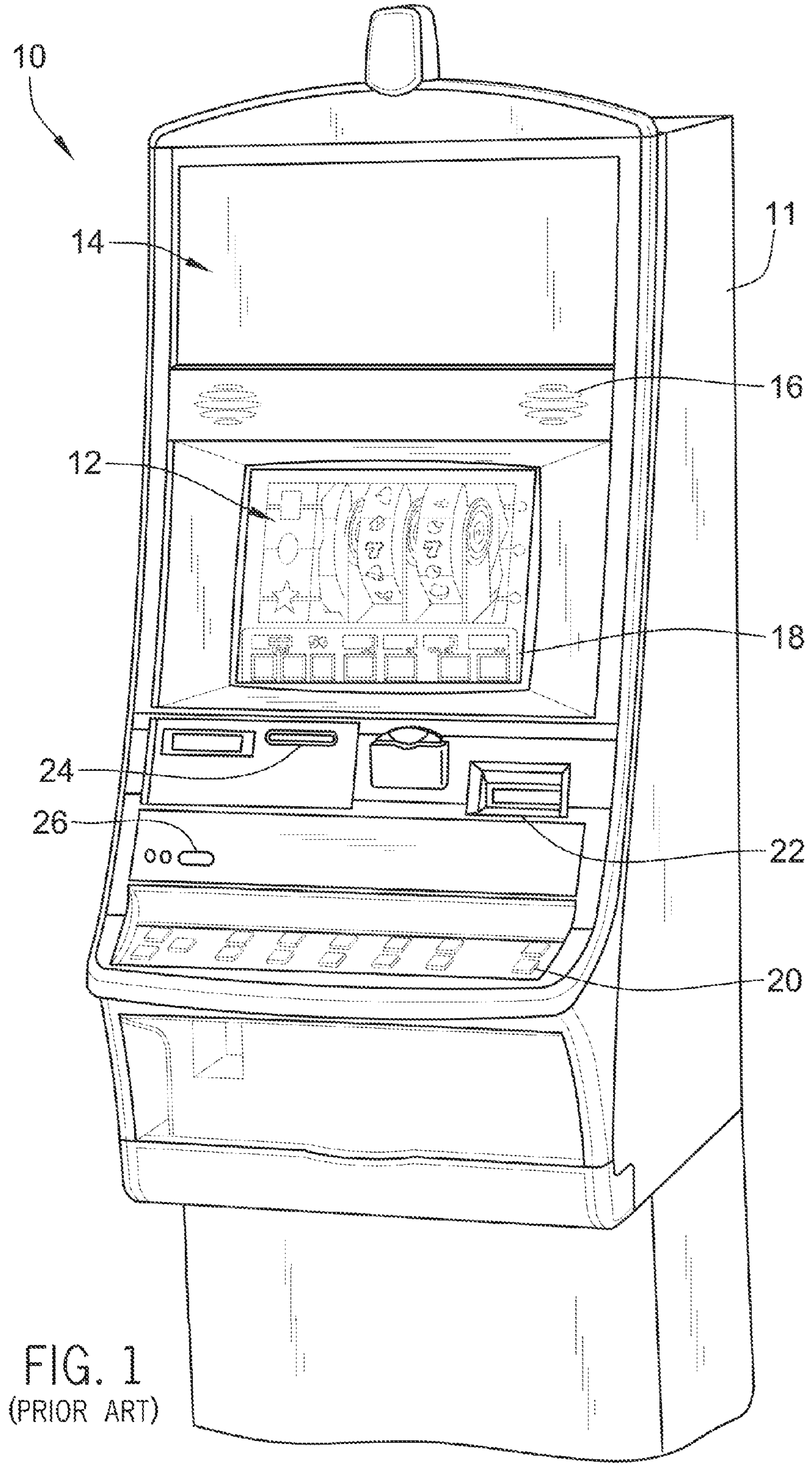
FIG. 1 (PRIOR ART)
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those used in gaming establishments, such as casinos. With regard to the present invention, the gaming machine 10 may be any type of gaming machine or machine and may have varying structures and methods of operation. For example, in some aspects, the gaming machine 10 is an electromechanical gaming machine configured to play mechanical slots, whereas in other aspects, the gaming machine is an electronic gaming machine configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in conducting wagering games, or may include non-dedicated devices, such as mobile phones, personal digital assistants, personal computers, etc. Exemplary types of gaming machines are disclosed in U.S. Pat. No. 6,517,433, U.S. Pat. No. 8,057,303, and U.S. Pat. No. 8,226,459, which are incorporated herein by reference in their entireties.

The gaming machine 10 illustrated in FIG. 1 comprises a cabinet 11 that may house various input devices, output devices, and input/output devices. By way of example, the gaming machine 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a game-logic circuitry for processing. The electronic data signals are selected from a group consisting essentially of an electrical current, an electrical voltage, an electrical charge, an optical signal, an optical element, a magnetic signal, and a magnetic element.

Figure 2:
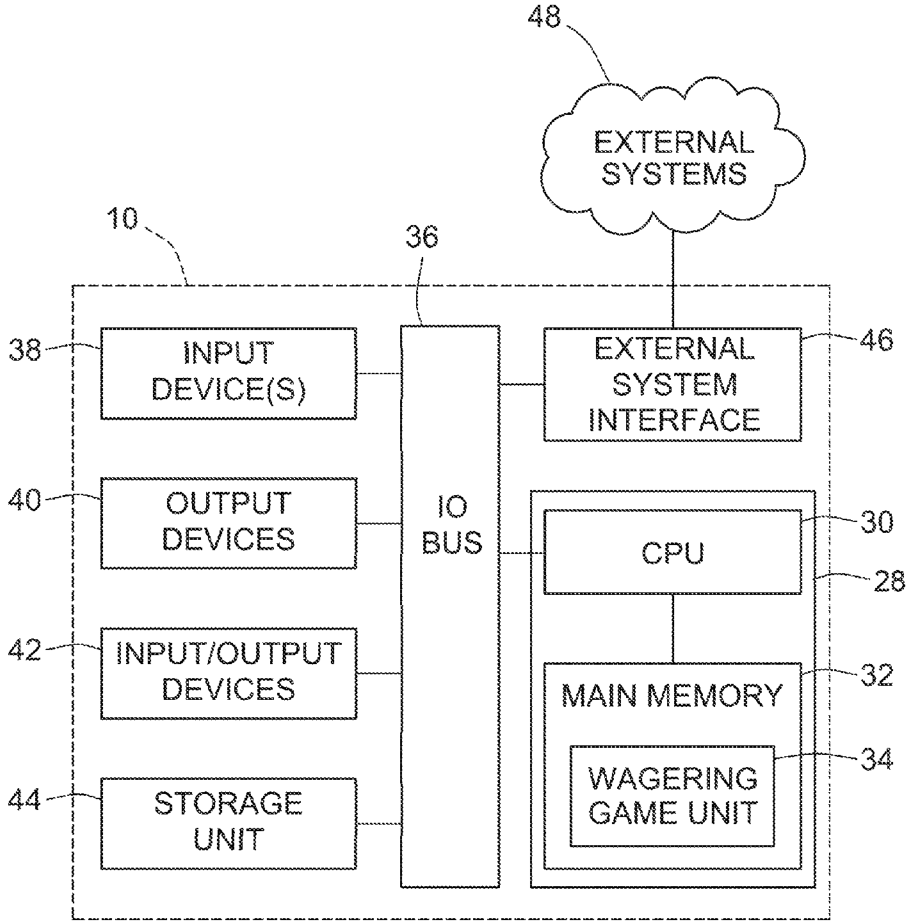
FIG. 2 (PRIOR ART)
FIG. 2 is a schematic view of a gaming system according to an embodiment of the present invention.

Turning now to FIG. 2, there is shown a block diagram of the gaming-machine architecture. The gaming machine 10 includes game-logic circuitry 28 having a central processing unit (CPU) 30 connected to a main memory 32. The CPU 30 may include any suitable processor(s), such as those made by Intel and AMD. By way of example, the CPU 30 may include a plurality of microprocessors including a master processor, a slave processor, and a secondary or parallel processor. Game-logic circuitry 28, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 28, and more specifically the CPU 30, comprises one or more controllers or processors and such one or more controllers or processors need not be disposed proximal to one another and may be located in different devices or in different locations. The game-logic circuitry 28, and more specifically the main memory 32, comprises one or more memory devices which need not be disposed proximal to one another and may be located in different devices or in different locations. The game-logic circuitry 28 is operable to execute all of the various gaming methods and other processes disclosed herein. The main memory 32 includes a wagering-game unit 34. In one embodiment, the wagering-game unit 34 may cause wagering games to be presented, such as video poker, video black jack, video slots, video lottery, etc., in whole or part.

The game-logic circuitry 28 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to a storage unit 44 and an external-system interface 46, which may be connected to external system(s) 48 (e.g., wagering-game networks).

The external system 48 includes, in various aspects, a gaming network, other gaming machines or terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external-system interface 46 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 48 such that the gaming machine 10 operates as a thin, thick, or intermediate client. The game-logic circuitry 28—whether located within ("thick client"), external to ("thin client"), or distributed both within and external to ("intermediate client") the gaming machine 10—is utilized to provide a wagering game on the gaming machine 10. In general, the main memory 32 (comprising one or more memory devices) stores programming for an RNG, game-outcome logic, and game assets (e.g., art, sound, etc.). When a wagering-game instance is executed, the CPU 30 (comprising one or more processors or controllers) executes the RNG programming to generate one or more pseudo-random numbers. The pseudo-random numbers are utilized by the CPU 30 when executing the game-outcome logic to determine a resultant outcome for that instance of the wagering game. The resultant outcome is then presented to a player of the gaming machine 10 by accessing the associated game assets, required for the resultant outcome, from the main memory 32. The CPU 30 causes the game assets to be presented to the player as outputs from the gaming machine 10 (e.g., audio and video presentations).

The gaming machine 10 may include additional peripheral devices or more than one of each component shown in FIG. 2. Any component of the gaming-machine architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
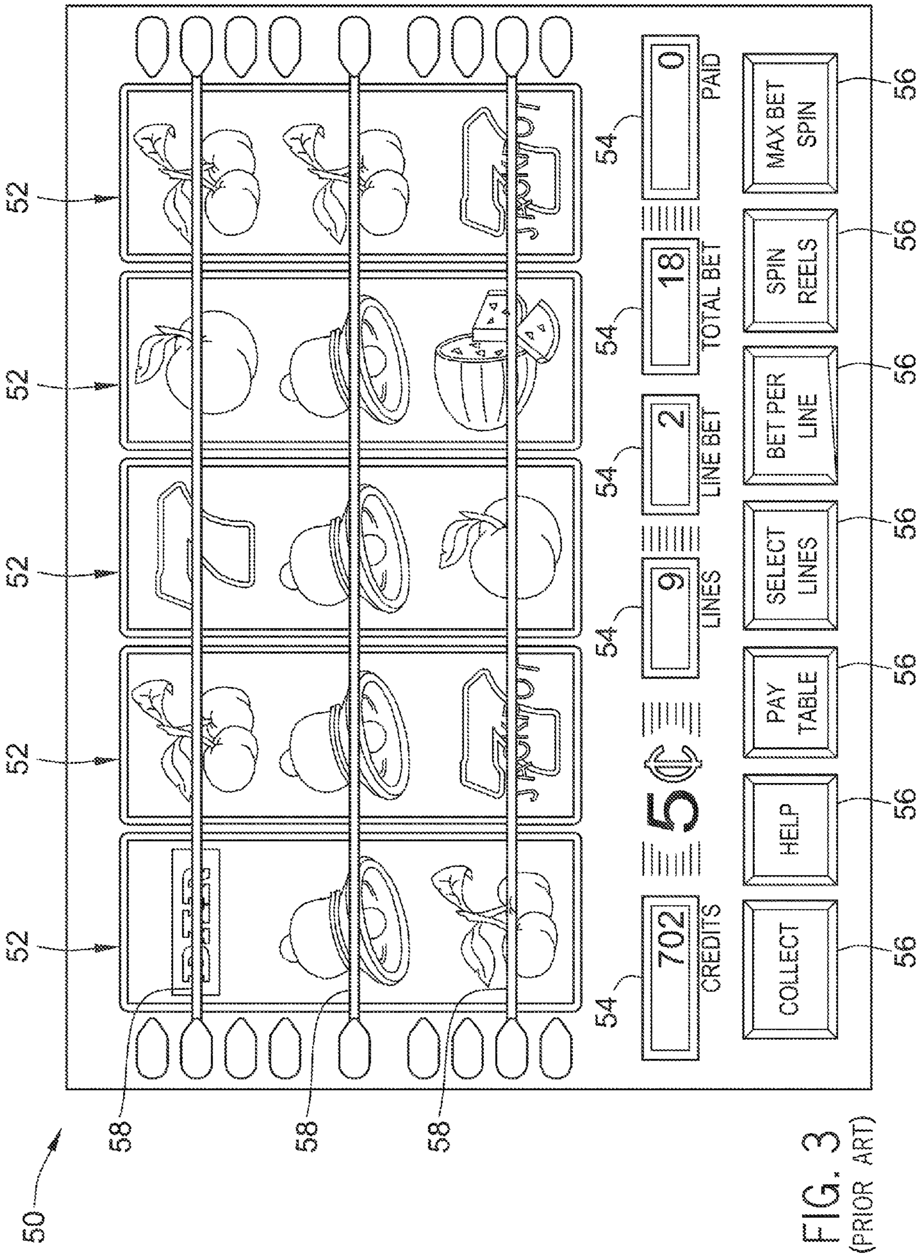
FIG. 3 (PRIOR ART)
FIG. 3 is an image of an exemplary basic-game screen of a wagering game displayed on a gaming machine, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The game-logic circuitry 28 operates to execute a wagering-game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 12 or secondary display 14) through the display of information such as, but not limited to, text, graphics, static images, moving images, etc., or any combination thereof. In accord with the method of conducting the wagering game, the game-logic circuitry 28 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 28 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 30 causes the recording of a digital representation of the wager in one or more storage media (e.g., storage unit 44), the CPU 30, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU 30 (e.g., the wager in the present example). As another example, the CPU 30 further, in accord with the execution of the stored instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 28 to directly or indirectly determine the outcome of the wagering-game instance. A random parameter used for such a purpose may be achieved by polling the RNG (asking for a random number and receiving a response) to obtain a suitable random value for use in determining the wagering game outcome. In many instances, the game-logic circuitry is configured to determine an outcome of the wagering-game instance at least partially in response to the random parameter.

Figure 4:
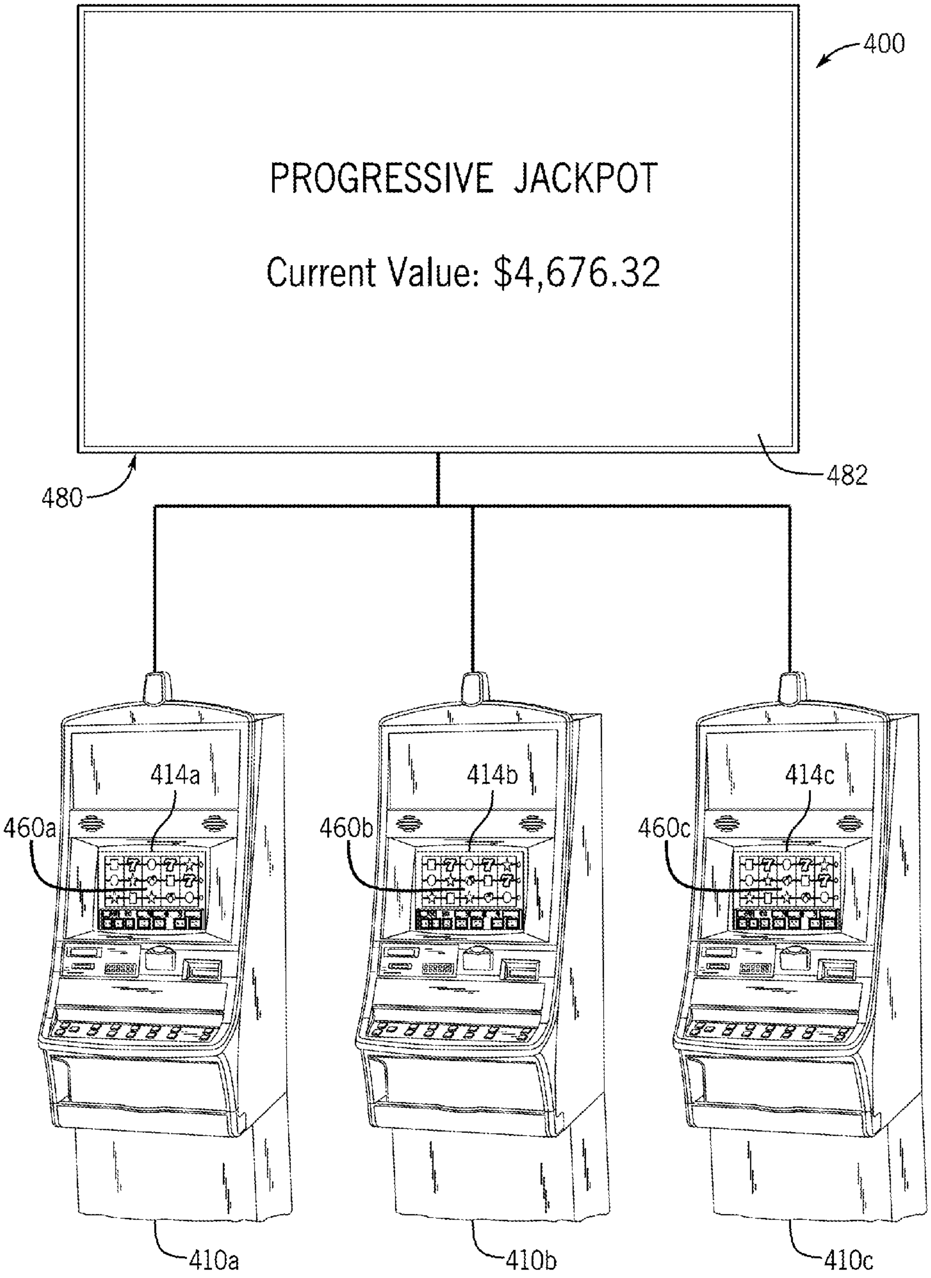
FIG. 4 is a depiction of a gaming system including a plurality of gaming machines and a community display displaying at least one progressive jackpot.

Turning to FIG. 4, a gaming system 400 eligible for progressive jackpots is displayed. The system 400 includes a plurality of gaming devices 410*a-c*, each of which includes at least a primary display 414*a-c* for displaying game events thereon. Each of the primary displays 414*a-c* may be any form of display such as those described herein with reference to the gaming device of FIG. 1. The primary displays 414*a-c* may include a display of a primary wagering game 460*a-c*, which are slot games in the embodiment shown in FIG. 4. The primary wagering games 460*a-c* may include a plurality of reels, which may be either electro-mechanical reels or simulations thereof on the primary display 414*a-c*. The reels include a plurality of symbols thereon which vary as the reels are spun and stopped. The symbols may include any variety of graphical symbols, elements, or representations, including symbols which are associated with one or more themes of the gaming machines 410*a-c* or system 400. The symbols also include a blank symbol, or empty space. The primary wagering games 460*a-c* shown on the various primary displays 414*a-c* of the system 400 may be the same, similar, or different in nature, game play, theme, denomination, formation, eligibility, etc.

As described herein, in some embodiments, symbols landing on the active pay lines (the pay lines for which a wager has been received) are evaluated for winning combinations. Winning combinations, and their respective awards, are typically delineated in a pay table associated with the wagering game. Awards are provided when a combination of symbols, that matches a winning combination from the pay table, lands on an active pay line. The symbols on the reels form an array or matrix of symbols, having a number of rows and columns, which in the embodiment shown has three rows and five columns. In alternate embodiments, the array may have greater or fewer symbols, and may take on a variety of different forms having greater or fewer rows and/or columns. The array may even comprise other non-rectangular forms or arrangements of symbols. In alternative embodiments, other criteria may be used for winning combinations, such as symbol arrangement or configuration without regard to paylines.

The system 400 further includes at least one community display 480, which in this embodiment is an LCD, plasma, or other flat-screen display mounted and positioned above the plurality of gaming devices 410*a-c*. The community display 480 displays a community award in the form of at least one progressive award or progressive jackpot 482, and thus includes prize and award information related to the progressive jackpot 482. In the embodiment shown, the progressive jackpot 482 comprises an award which increments in response a plurality of players participating in underlying primary wagering games 460*a-c*, and placing primary wagers thereon. As described herein, a portion of each primary wager received into the gaming system 400 contributes to a progressive jackpot increment amount, which causes the progressive jackpot 482 to increase in value, as displayed on the community display 480. In an embodiment, the progressive jackpot 482 continues to receive increment amounts, thereby increasing in value, until a triggering event occurs and the jackpot 482 is awarded to a player. In one embodiment, the progressive jackpot 482 is reset to a predetermined reset value when the progressive jackpot is awarded.

The community display 480, in this example, communicates information concerning results and status of the progressive jackpot 482. In an embodiment, the community display 480 displays a name of the progressive jackpot, the current progressive award amount, and further announces the occurrence of a triggering event by displaying indicia indicating that the progressive jackpot 482 has been awarded to a player. Alternatively, or additionally, information relevant to the progressive jackpot 482 may be displayed on the primary displays 414*a-c,* or on any other appropriate display.

The community display 480 is typically be placed in an appropriate place within a casino or operator's facility, for example, a gaming room in a casino, the entry area of a casino, elevators of a casino, or any other public place inside or outside of a casino. Publicly displaying progressive award information creates a community environment for gaming participants so as to incentivize players to play games eligible for such progressive awards 482. Players can discuss their results and the results of others. Seeing and discussing the results of others also creates an environment of friendly competition. This competition may spur some players to participate in more wagering game play in an effort to win the progressive award 482. This environment of community and competition also creates player loyalty. It should be noted that the information provided on the community display may be limited or delayed as desired by a casino or operator. For example, players' names, identifiers, and other information may be withheld from the community display so as to protect player anonymity.

Figure 5:
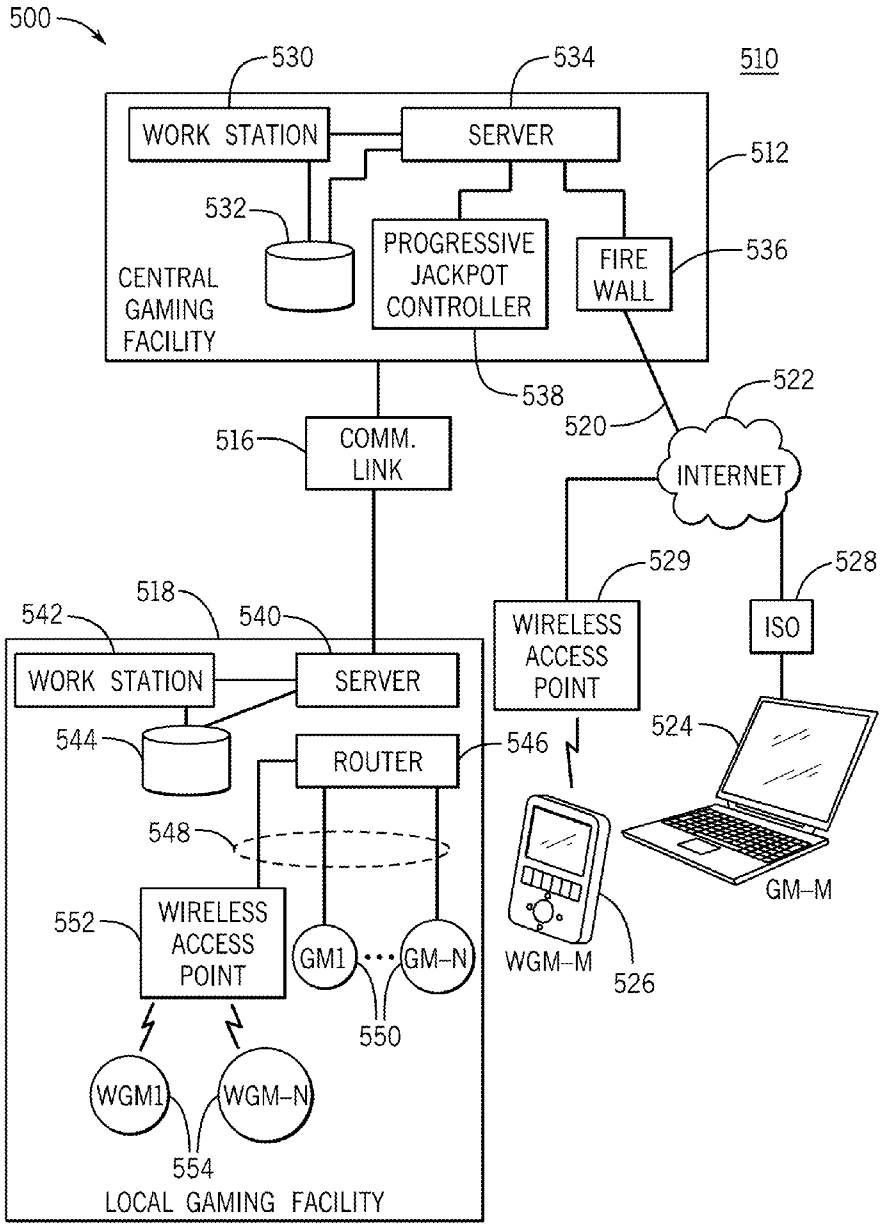
FIG. 5 is a diagram of an example gaming system including a progressive jackpot controller server.

Turning to FIG. 5, a diagram of an example gaming system 500 having progressive awards is depicted. Shown in FIG. 5 is an exemplary gaming system 510 which includes a central gaming facility 512 connected by a communication link 516 to a local gaming facility 518 (e.g., a casino) and by a link 520 with the internet 522. End-user computing devices including a gaming machine or terminal GM-M 524 (e.g., a laptop computer) and a wireless gaming machine or terminal WGM-M 526 (e.g., a personal digital assistant (PDA)) function as clients of the central gaming facility 512. A laptop 524 is coupled via an internet service provider 528 and the internet 522 with the central gaming facility 512. The PDA 526 is connected with a wireless link by the wireless access point 529 and the internet 522 to the central gaming facility 512. As used herein, "gaming" refers to the use of various games that support the placing of wagers on the outcome of the games (e.g., a video poker machine). It is also noted that gaming may include social gaming taking place on social networking sites connected via a wide-area-network, site specific gaming taking place on a local-area-network, virtual gaming taking place on a remote and/or mobile computer with a representative player in a virtual casino, and physical gaming taking place in a brick-and-mortar casino. The invention, with its many embodiments, is able to perform as described in all of these preceding systems and environments, as an integral or optional part of wagering games, social games, and any number of combinations or alternatives thereof.

The central gaming facility 512 represents a control location of a gaming business operator that supports individual gaming users (e.g., users of the PDA 526 and the laptop 524) as well as other gaming facilities of the operator such as the casino 518. The central gaming facility 512 in this illustrative example is geographically separated from the casino 518 and the individual users. The central gaming facility 512 includes a workstation 530 supported by data storage element 532 and a server 534 that serves as a communication host for casino 518 and the individual users via a firewall 536. Requests for information and/or data received from the individual users are processed by the server 534. The requested information and/or data may be obtained from support resources (e.g., the workstation 530) and data residing in the storage element 532. The requested information is sent from the server 534 to the requesting user's device(s).

The local gaming facility 518 represents a casino and includes a server 540 supported by a workstation 542, a data storage element 544, and a router 546. The router 546 supports communications with different gaming machines GM(1)-GM(N) 550 by the wired links 548. A wireless access point 552 is connected by a wired link 548 to the router 546 and by wireless communication links to the wireless gaming machines WGM(1)-WGM(N) 554.

At least some of the gaming machines 550 and some of the wireless gaming machines 554 support the play of wagering games in which the user's gaming machine functions in the client/server communication model with the user's gaming machine being a client of server 540. The user's gaming machine contains software that facilitates the ongoing play of the wagering game. However, some information or data associated with the play of the game may be obtained during the ongoing play of the game from the server 540. Thus, the gaming system 510 may be configured to execute and display a variety of primary wagering games, community games, and progressive wagering games on the gaming machines [GM(1)-GM(N) 550, WGM(1)-WGM (N) 554, GM-M 524, and WM-M 526], as explained further herein.

As seen in FIG. 5, the central gaming facility 512 also includes a dedicated progressive jackpot controller 538. The progressive jackpot controller 538 may be separate from or integrated with the server 534 or other servers of the facility 512. Moreover, the progressive jackpot controller 538 may be located in the local gaming facility 518, for example in communication with the local server 540. The progressive jackpot controller 538 and/or the workstation 530 include software which operates to control, manage, execute, and operate the available progressive jackpots as described herein. For example, such software may log in users to the system, detect and catalog their play of primary wagering games, monitor their wager amounts and history, detect occurrences of jackpot triggering events, and award triggered jackpots to players. The progressive jackpot controller 538, for example, permit players to access a player history file or profile to see past awards won, past results, etc. The progressive jackpot controller 538 provides access to players within a casino or gaming facility over the link 516, or may otherwise provide access to players remote from the gaming facility, for example over a home or mobile computer via link 520. It should further be understood that any of the functions described herein as relating to the central gaming facility 512 may alternatively or additionally be performed at the local gaming facility 518, or by any computer or server in communication therewith.

Each wagering game will have a set of default settings which specify the pay table (including the winning combinations and pay out amounts for each) and an eligibility for a given wager based on a given wagering amount. For example, in order to be eligible for a secondary or bonus game or event, including a jackpot progressive, a wagering game will typically require a "max bet" wager (the maximum wager amount on a maximum number of lines) or some other expressly recited wager amount which specifies a minimum wagering amount to be eligible for these features by default (without further requirements or alterations). When a player wagers less than this minimum amount, eligibility for the secondary event, jackpot progressive, etc. is not granted and is generally not available to the player.

Various embodiments of the present invention describe a system and method for enhanced progressive eligibility which specifically relates to enabling a player to make choices for the wagering conditions of a wagering game which reduce the wager amount and maintains eligibility for one or more progressive jackpots.

In some embodiments, the present invention enables a player to specify or modify a set of default settings of a wagering game. A wagering game may have a set of default settings which specifies the wager amount, pay table, pay outs, and associated progressive eligibility when no user selection is made or specified. In response to a player providing selection of a set of settings for the wagering game, eligibility may be granted (or maintained at a lower wager amount) for one or more secondary event(s) and progressive jackpots, where such eligibility would not typically be granted in view of one or more values of the modified settings (e.g., wager amount). The invention includes selection by the player and/or the wagering game to specifically select or otherwise alter the balance between the pay table, the wager amount, and the associated eligibility defined by the set of default settings. Modifications of the pay table may include changing the winning combinations of the pay table and/or payment amounts for each winning combination specified in the pay table. In short, some embodiments of the invention provide a way for a player to have an option to maintain eligibility at a lower wager level (a level where eligibility would not be granted in the default state), provided the player sacrifices other in-game beneficial awards and/or outcomes.

These wagering game sacrifices enable conducting a wagering game that grants eligibility for bonus or secondary events, such as one or more progressive jackpots, where eligibility for the bonus or secondary events would not normally be granted by default at a specific wager amount. Specifically, use of the term "progressive eligibility," or "eligibility for a progressive jackpot," directly indicates that a player is capable of winning or participating in a given secondary event or progressive jackpot. That is, a player who is eligible to win a progressive jackpot award is simply capable of achieving a triggering event to award the progressive jackpot award within the wagering game. If a player is eligible to trigger a progressive jackpot award, the probability of triggering the progressive jackpot award cannot be zero.

In one embodiment, a player has the ability to modify or select a combination of wagering amount, pay table winning combinations, and/or associated pay table amounts for winning combinations which differ from the default setting and maintain eligibility for one or more progressive jackpots at wager levels that would are not eligible at a given wagering amount in the default settings. For example, a player may be able to select a wager amount from a list of predetermined wagering amounts for a video slot wagering game, wherein each predetermined wagering amount is tied to a specific (reduced) number of paylines in play and a corresponding eligibility for a given progressive jackpot. That is, each predetermined wager amount has a set of corresponding sacrifices to the pay table to enable the player to gain or maintain eligibility for the progressive jackpot.

In another embodiment, the player may select a wager amount from a range of available wager amounts and be assigned a corresponding reduction or sacrifice in winning potential to gain or maintain eligibility in one or more progressive jackpots. In another embodiment, a player may select a set of reductions or sacrifices in a wagering game pay table, in exchange for a reduced wagering price, and be eligible for one or more progressive jackpots which would not be available at that wagering price point by default. In short, a combination of a given wagering amount, combined with the winning combination entries and associated payout amounts of the pay table are selected by the player which maintains or grants eligibility in one or more progressive jackpots, where eligibility would not normally be granted for the given wagering amount using the default mechanics and pay table of the wagering game.

Various types and configurations of wagering machines, including slot machines and video slot machines participating in progressive jackpots, may use various embodiments of the invention detailed above. Slot machines and video slot machines may additionally provide a wide variety of combinations of wagering-level amounts and respective pay tables having reduced winning combinations and corresponding payment amounts for each which allow the player to remain eligible for one or more secondary events, like winning a progressive jackpots. This enables a player to wager less for each wagering game and remain eligible for highly beneficial rewards, striking a balance between acceptable wagering amounts, potential pay table returns, and progressive jackpot eligibility.

Figure 6A:
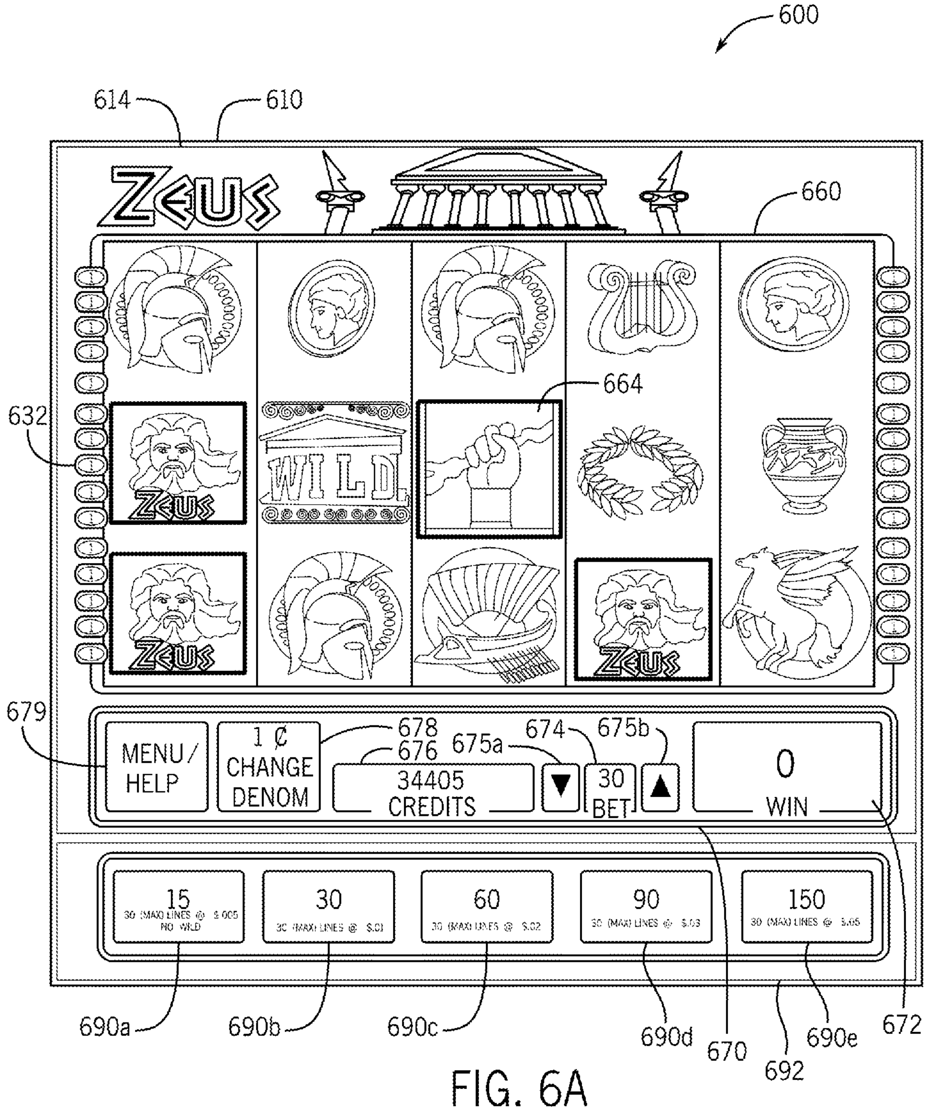
FIGS. 6A-6C are depictions of a video slot machine wagering game performing assignment of progressive jackpot eligibility in accordance with one embodiment of the invention.

Referring to FIG. 6A, a primary display 614 of a gaming machine 610 of a gaming system 600 is displayed in which players may place different sized wagers which are all eligible for participation in a progressive jackpot award. Displayed on the primary display 614 is a primary wagering game 660. The primary wagering game 660 is a slot reel game, such as those depicted and described with reference to FIGS. 1 and 3-4. In this embodiment, two input devices are provided to a player: a control panel 670 along a bottom of the display 614, and a plurality of buttons 690*a*-*e* housed on a button panel 692 of gaming machine 610. The button panel 692 may be mounted on any appropriate place on the gaming device 610, such as below the primary display 614.

The control panel 670 includes a win meter 672, a bet meter 674, bet adjustment controls 675*a*-*b*, a credit meter 676, a denomination button 678 and a menu/help button 679. The win meter 672 displays to the player an amount of credits won on a previous play of the wagering game 660. The credit meter 676 displays a balance of remaining credits available to a player of the gaming machine 610. Wagers placed on the wagering game 660 are debited from the credit meter 676. Wagering game rewards following game play of wagering game 660 are displayed by the win meter 672 and are transferred or credited to the credit meter 676. The denomination button 678 allows a player to change the base denomination that he is playing, and displays the value of one credit (which in this instance is one cent). Thus, for each credit wagered, one penny ($0.01) is being wagered. The menu/help button 679 provides access to further help and menu screens for a variety of other functions, including learning more about the play of the wagering game 660, and selecting various preferences related thereto.

The bet meter 674 and adjustment controls 675*a*-*b* permit a player to see his current wager level and adjust the amount of credits that he is wagering on each play of the wagering game 660. The bet meter displays the current wager amount, which in this instance amounts to 30 credits (one credit wagered on each activated payline). As seen by the payline markers 632 on the left and right edges of the display, this wagering game 660 includes a total of thirty (30) paylines 632 which the player may activate.

In one embodiment, in response to the player activating all available paylines 632 an immediate eligibility for all secondary events (including progressive jackpots) are assigned. Likewise, activating less than all available paylines 632 (or wagering less than a predetermined default minimum amount of credits) causes the player to be ineligible all the secondary events. As detailed prior, a reduction or sacrifice in winning potential(s) may be selected by a player to ensure eligibility for a progressive jackpot at a lower wager amount which would render the player ineligible for the progressive jackpot by default.

The adjustment controls 675*a-b* may be used by a player to either increase the wager (using the up arrow control 675*b*) or decrease the wager (using the down arrow control 675*a*). The button panel 692 further provides an alternative method by which a player can adjust his wager amounts. In one embodiment, a plurality of wager buttons 690*a-e* may be provided which correspond with a plurality of discrete permissible wagers, all of which are eligible for progressive jackpot triggering, even though the wagering amount is below the default requirement for progressive jackpot eligibility. As seen in FIG. 6A, the five buttons 690*a-e* are labeled with wager amounts which they represent, and are implemented to wager credits and initiate the wagering game 660. The first button 690*a* corresponds to a wager of fifteen credits (a half credit per activated payline). The second button 690*b* corresponds to a wager of thirty credits (one credit per activated payline). The third button 690*c* corresponds to a wager of sixty credits (two credits per activated payline). The fourth button 690*d* corresponds to a wager of ninety credits (three credits per activated payline). The fifth button 690*e* corresponds to a wager of one hundred fifty credits (five credits per activated payline). Pressing one of the buttons 690*a-e* causes the corresponding wager to be set for an upcoming play of wagering game 660, and is reflected in the bet meter 674. In an alternative embodiment, pressing one of the buttons 690*a-e* adjusts the wager amount, correspondingly assigns the according progressive jackpot eligibility, and provides "spin" button game initiation, initiating play of the wagering game 660 causing the reels to commence spinning In operation, a progressive jackpot controller (such as the one described in reference to FIG. 5) controls and administers available progressive jackpots. The progressive controller receives wager information from each gaming machine and uses such information to calculate a suitable increment amount for the current progressive award. Most often, the increment comprises a percentage of each wager used to increase the value of the progressive jackpot. In addition, the progressive controller monitors the occurrence of jackpot triggering events.

In one embodiment, a jackpot triggering event comprises four or more "Jackpot" symbols aligning on an activated payline in a primary wagering game 660. For example, in FIG. 6A, the "Lightning in Fist" symbol 664 (third symbol in second row) is a jackpot symbol, and four or more such symbols 664 landing on an activated payline trigger an award of the progressive jackpot. In an alternative embodiment, the jackpot symbols are evaluated on a scatter pay basis without regard to their position relative to any paylines. In such an embodiment, four or more "Lightning in Fist" symbols 664 landing anywhere in the array of symbols triggers the progressive jackpot.

Once triggered, the progressive jackpot is awarded to the player at the gaming machine who caused the triggered event. Thus, a player who achieved the four or more jackpot symbols, as described above, would receive the current balance of the progressive jackpot displayed on the jackpot meter. The progressive jackpot would then be reset to a given reset value by the progressive controller. Once reset, future wagers received would continue to build up the progressive jackpot again, in the same fashion, by contributing an increment amount from each wager of each participating gaming machine to the progressive award.

Remaining eligible for a progressive jackpot is highly desirable by players of wagering games of this type. Various embodiments of the invention enable a player to remain eligible for one or more progressive jackpots for a wagering game—even while wagering at a lower wager level—by using a modified pay table having reduced winning combinations and/or reduced winning potential for winning combinations in the pay table. In one embodiment, a reduction of the winning potential for the wagering game includes a sacrifice of payout of the entire pay table by a given percentage (e.g., the payout value for each winning combination of the pay table for each line drops by 20%). In another embodiment, specific winning combinations of the pay table may be entirely removed (e.g., no wins are counted using the ZEUS symbol) as compensation for remaining or becoming eligible for a progressive jackpot. In another embodiment, winning combinations for a defined subset of entries in the pay table are removed (e.g., only five-of-a-kind symbol combinations are considered wins, not three or four-of-a-kind symbol combinations). In another embodiment, instead of removing winning combinations containing symbols from the pay table, symbols may be removed (or substituted) from the reel(s) used to determine outcomes for the wagering game. In another embodiment, one or more symbols may be used to manipulate the pay table and/or reels in this way. In another embodiment, the removal of particular winning combinations may be equated to a given value or amount used to decrease the "max bet" and/or "max lines" requirement for progressive jackpot eligibility of a given wagering game.

Figure 6B:
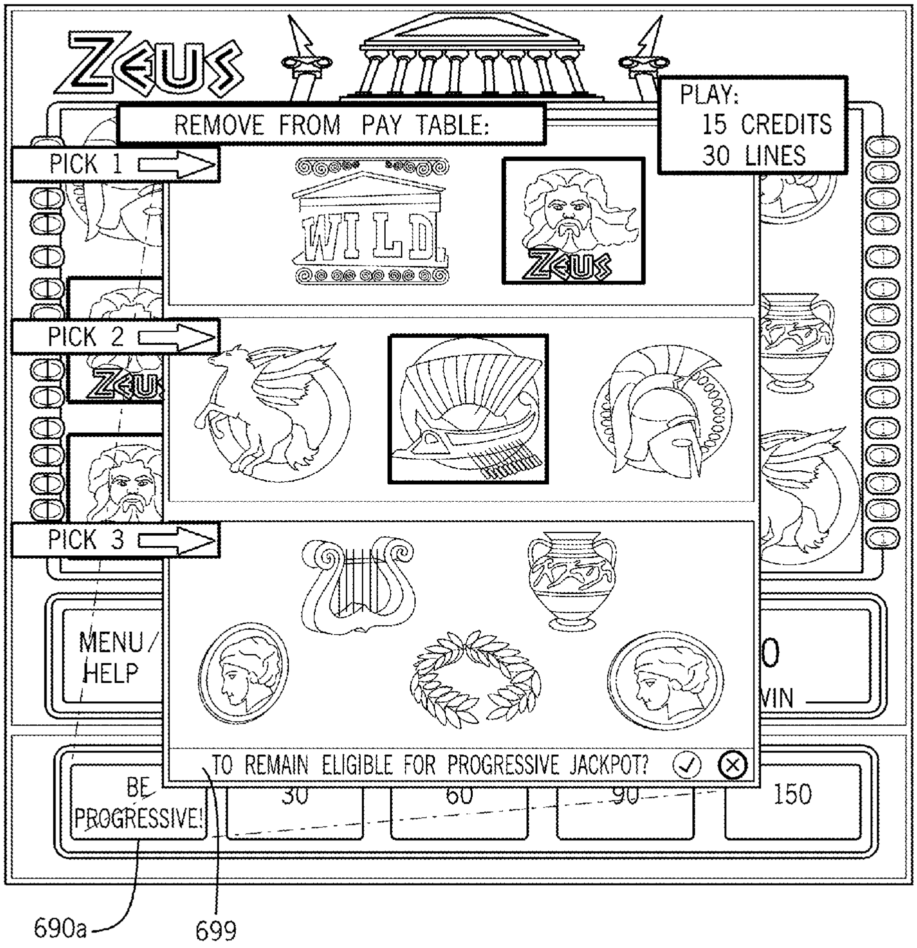

In one embodiment, eligibility for a progressive jackpot is assigned after a player selection of a lower wager and an accompanying modified pay table is automatically designated. In another embodiment, a modified pay table is not automatically assigned, but instead, is selected by the player. Referring to FIG. 6B, the player is given an option using a user interface (e.g., the graphical user interface button 690*a*), to select features for a modified pay table by sacrificing winning combinations containing one or more symbols in the pay table. This will enable the player to wager less using this modified pay table and simultaneously remain eligible for the progressive jackpot. The player is presented with an overlay dialog box 699 to obtain user input and confirmation of choice to remove one or more winning combinations from the pay table of the wagering game. The dialog box 699 reflects the wagering amount (e.g. fifteen credits playing thirty lines) and further includes three different choices for the player regarding removal of symbols from the pay table. In the current instance, the player has the option of removing a single high paying symbol (e.g., WILD or ZEUS), two lower paying symbols (e.g., Pegasus, ship, or helmet), or three lowest paying symbols (e.g., silver coin, harp, wreath, vase, or golden coin). Once a selection is made, confirmation of the selection is performed by the player using the dialog box 699. Once confirmed, the wager is set, the pay table changes are made, eligibility for any suitable progressives is assigned, and the wagering game may initiate using these modified conditions. While specific examples of a particular dialog box, symbols, wagering amount, lines in play, winning combinations, alterations to the pay table, and modified requirements for sustained progressive jackpot eligibility are provided, any or all of these features may be altered without departing from the intended spirit or scope of the invention.

Another example of pay table changes may include random selection of symbols and/or combinations of symbols to remove from the pay table, reels, or both. Further, the lowering the payout or probability of particular combinations containing one or more specific symbols, by a predetermined ratio, is also possible. The manipulation of symbols in play may also be altered by modifying WILD symbols to be WILD for some symbols, but not for other symbols. The impact of the changes to the modified wager amount, the payout combinations and their associated amount, and the eligibility to progressive jackpots are all collectively considered when determining the conditions which will be used for the wagering game. Ultimately, the manipulation of these factors gives the player the ability to modify the volatility of the wagering game without significantly modifying the expected value or return-to-player ratios of the wagering game.

Figure 6C:
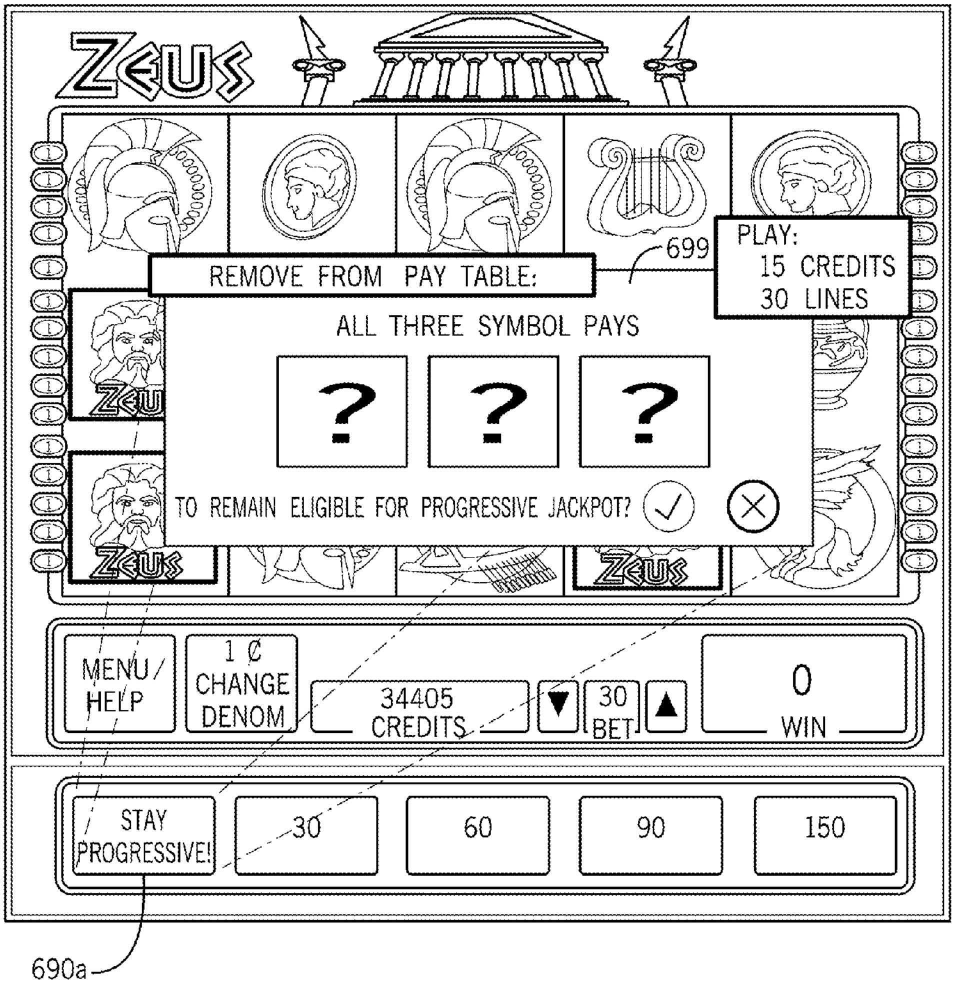

Referring to FIG. 6C, in another embodiment, the player opts to modify the pay table by wagering less per game and remaining eligible for one or more progressive jackpots in exchange of removing a defined set of lower paying combinations from the pay table. The player implements a user interface, for example, a button 690*a,* to provide an overlay dialog box 699 to confirm an elected removal of winning symbol combinations from the pay table as a sacrifice. The removed set of combinations includes a set of selected winning symbol combinations which conform to a particular pattern. Potential examples include selections of particular entries of the pay table directly, and/or the use of wildcards to designate patterns of symbol combinations. FIG. 6C shows a dialog box 699 specifying that all winning combinations having exactly three identical symbols will be removed from the pay table (payment reduced to zero), in addition to a lower wager amount for game play, and sustained progressive eligibility. As above, the dialog box 699 permits the user to confirm the choice of pay table modification. After confirmation, game circuitry logic alters the pay table, assigns progressive jackpot eligibility accordingly, sets the wagering amount, deducts the wagering amount when the game is initiated, and conducts the game having these associated modified gaming conditions. In some embodiments, confirmation of the modified conditions for an upcoming game may cause the game to immediately initiate using those modified conditions.

Additionally, the progressive jackpot trigger event itself may be modified in exchange for progressive eligibility. For example, to be eligible to win a given progressive jackpot, a wagering slot machine may require playing the maximum number of paylines, triggering the progressive jackpot when four progressive jackpot symbols occur on one of the active paylines during play. In one embodiment of the invention, a player may be given an option to wager less for a game and/or play less than the maximum number of paylines, and still remain eligible for triggering the progressive jackpot, but only when the trigger event occurs on the center payline of the wagering game. Alternatively, any given payline which is randomly selected, user selected, or simply assigned by the wagering game may be specified to restrict a progressive jackpot trigger event in this manner. This essentially reduces and sacrifices winning potentials of the wagering game in exchange for a lower wager while maintaining eligibility for winning the progressive jackpot.

In another embodiment, as an effect of wagering a lower amount, a progressive jackpot slot machine may offer progressive jackpot eligibility only when a set of scattered trigger symbols meets or exceeds an elevated number of trigger symbols. That is, a “max bet” wager on the machine may trigger the progressive jackpot awarding when four jackpot symbols appear anywhere on the screen, but five jackpot symbols may be required for winning the same progressive jackpot when wagering lesser amounts. The number of symbols required to trigger one or more progressive jackpots may be altered solely in exchange for a reduction in the wagering amount, or as part of a different set of modified gaming conditions.

Various aspects of the pay table alteration and progressive jackpot eligibility may be changed without departing from the intended spirit or scope of the invention. In various embodiments, the player is given the flexibility to select the details of how the gaming experience is going to change (i.e., the changes in winning combinations, both types and payouts), including resultant assignment of eligibility for one or more progressive jackpots, all accompanying a lower wagering amount. For example, a player may be given the choice to remove any number of the symbols presented in the dialog box of FIG. 6B, and have one or more progressive jackpot eligibilities subsequently assigned, with or without additional pay table modifications taking place presented in FIG. 6C.

The resulting modifications to the underlying game mechanics enable a player (or operator) to selectively choose the ultimate volatility of the wagering game the player is playing. This is a result of a direct relationship (correlation) between the amount of wager game play, the payout of various winning combinations specified in the pay table, and assigned eligibility for each of the progressive jackpots. For example, all winning combinations which have a payout less than ten credits for each credit wagered may be entirely removed from the pay table. The flexibility of the amount of wager, pay table modification, and progressive jackpot eligibility, enables a player to selectively balance the rate at which a bankroll will diminish and simultaneously maintain the potential for winning large payouts, including one or more progressive jackpots.

In other embodiments, the disclosed process for enhanced progressive eligibility may include wagering games which are not related to (video) slot machines. Among these other types of wagering games are games including video poker, keno, BINGO, and even roulette. Other types of wagering games may also be equipped to provide one or more progressive jackpots, and also become suitable for applications of the invention in one or more embodiments.

As a specific example, some forms of video poker wagering games are known in the art to award a progressive jackpot when a Royal Flush (i.e., Ten, Jack, Queen, King, and Ace, all the same card suit) is achieved in the player’s hand. When playing prior art games of this type, progressive eligibility typically requires the player to wager a “max bet”, “max coins”, or a “minimum amount” requirement; wagering lesser amounts renders a player ineligible for winning the progressive jackpot. Once eligible for the progressive jackpot, a triggering event will award the progressive jackpot to the player. In one embodiment of the invention, a player may select a reduction or sacrifice in winning combination potential to become eligible for the progressive jackpot without the need to meet any minimum wagering amount requirement.

Figure 7B:
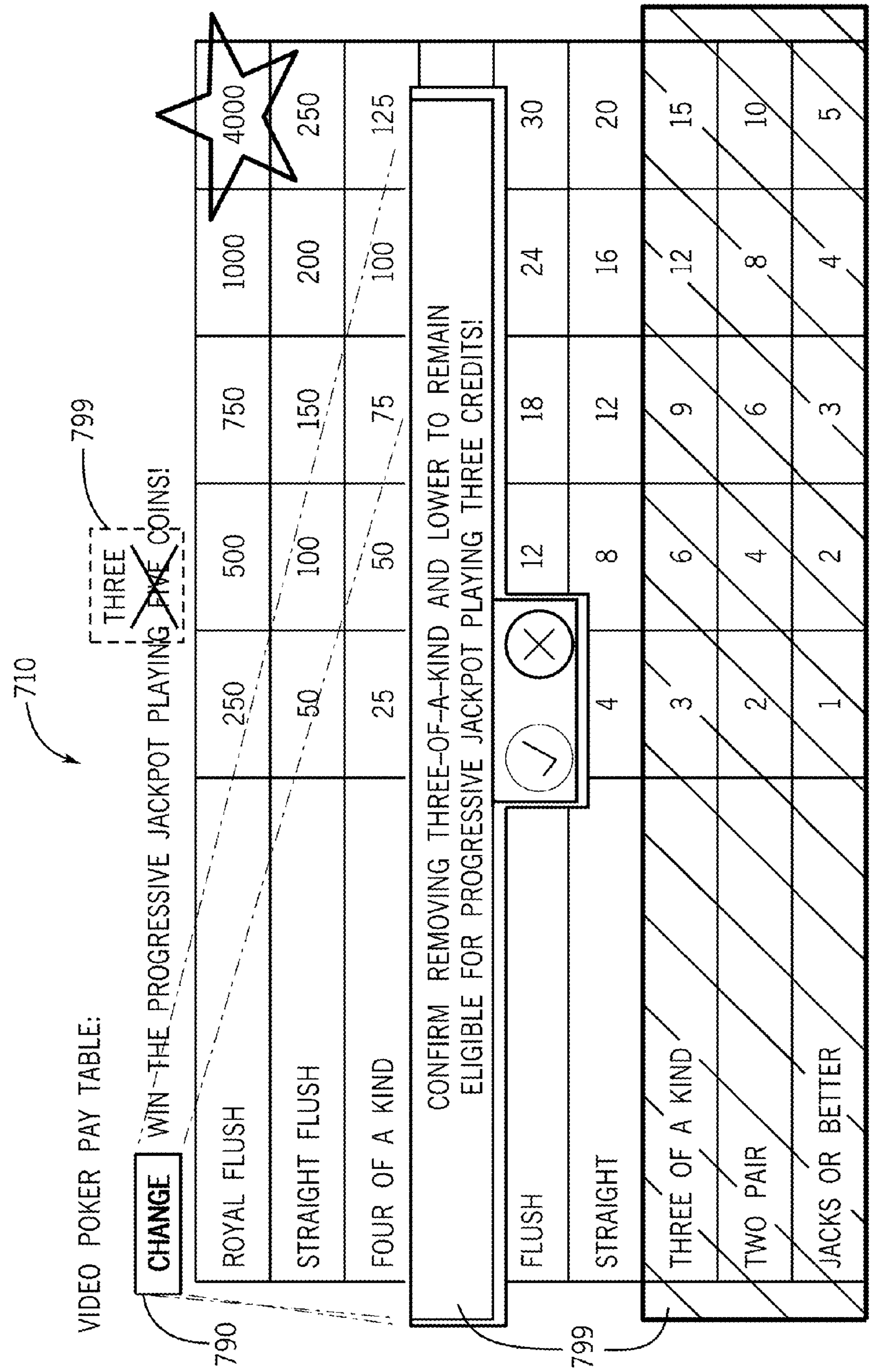

For example, as shown in FIG. 7A, the pay table 700 shows a progressive jackpot video poker wagering machine requiring that five coins (e.g., “max coins”) be wagered in order to trigger the progressive jackpot of the machine. As an alternative, the progressive jackpot video poker wagering machine may remove winning combinations from the pay table directly and assign progressive jackpot eligibility while playing less than five coins. This may include the removal of all winning combinations containing a particular card (e.g., an Ace, or a WILD deuce), or removal of all winning poker hand combinations below a given threshold (e.g. three-of-a-kind and lower) as shown in FIG. 7B.

A button 790 is used to obtain player input regarding the alteration of the pay table in exchange for eligibility for winning a progressive jackpot via the overlay dialog box 799. Upon selection, the button 790 presents the overlay dialog box 799 to the player and provides various messages and/or layovers for the pay table 710 which clearly point out the changes which the player will confirm or cancel prior to game play. These changes will define the modified conditions for a wagering game which differ from the default conditions of the base wagering game presented in FIG. 7A. FIG. 7B shows removal of all winning poker hands which are three-of-a-kind or lower from the pay table 710, a reduced wager amount (three coins), and an assigned eligibility for the progressive jackpot while using these modified conditions. Once the selections are confirmed by the player, the pay table is suitably altered, progressive jackpot eligibility is assigned, and the wagering game may be initiated using these modified conditions.

Various other aspects of the pay table alteration and progressive jackpot eligibility in a progressive video poker wagering game may be changed without departing from the intended spirit or scope of the invention. For example, the player may have the option to alter the pay table by removing one or more winning combinations related to one or more card suits. In one embodiment, payouts for any winning combination containing a particular card suit (e.g., Spades) may be reduced or sacrificed to grant progressive jackpot eligibility when only four dollar credit coins are wagered. For example, this may result in a winning combination FLUSH in Spades may become non-paying to provide eligibility for progressive jackpot triggering, even when the player obtains a Royal Flush in Spades. That is, the modification of winning combinations of the pay table may also include the progressive award trigger(s), such that one or more progressive jackpots are still awarded when the player hand or "line pay" are not awarded.

Figure 8A:
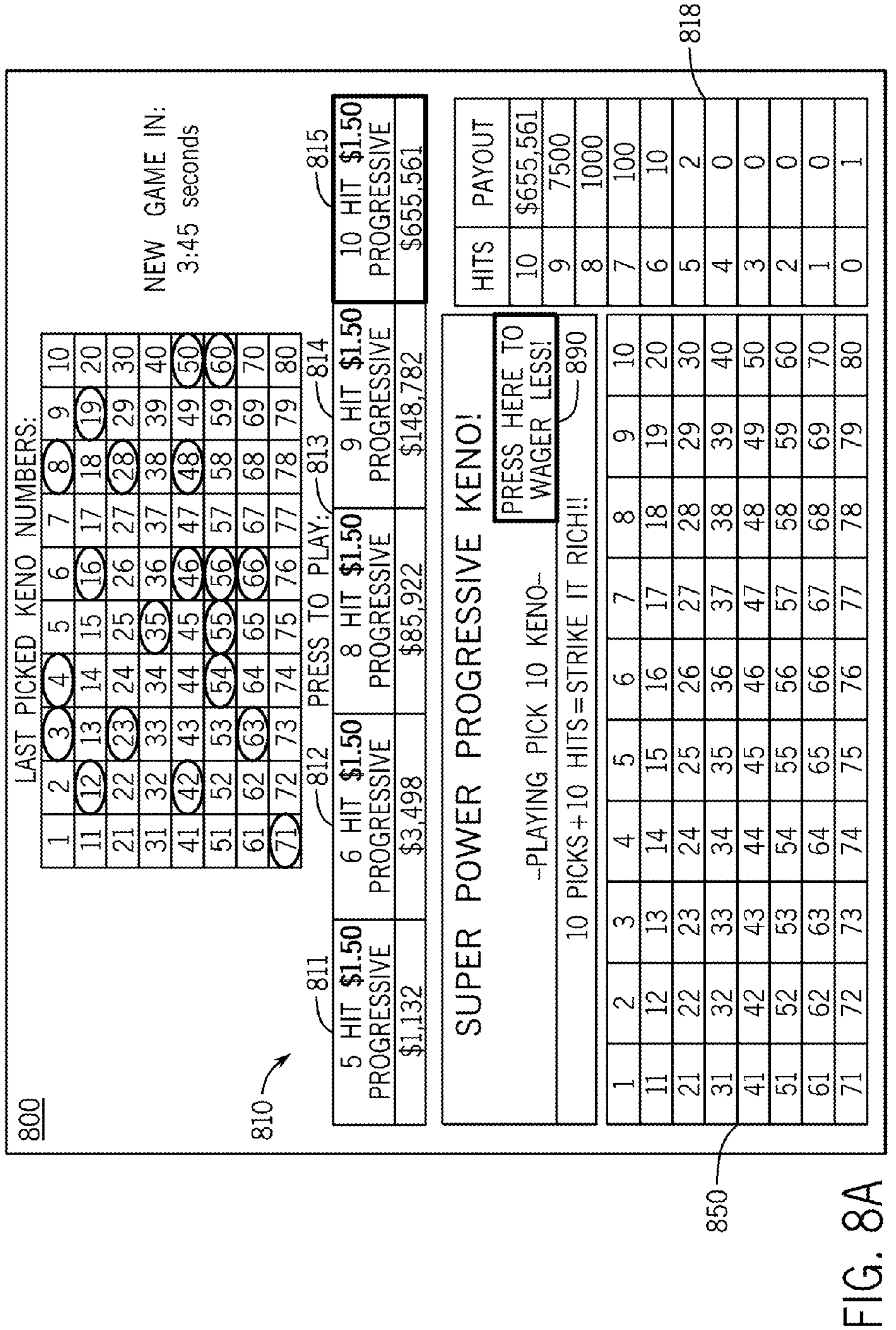
FIGS. 8A-8D are depictions of a video keno wagering game performing assignment of progressive jackpot eligibility in accordance with one embodiment of the invention.

Referring to FIG. 8A, an interface for playing a wagering game of progressive keno is shown. Keno card and a graphical user interface 800 is displayed having a play field 810. The play field 810 for the progressive keno wagering game comprises a number of game selection buttons 811-815, a pay table 818, and a number selection field 850. The game selection buttons 811-815 show the cost of playing the different keno games and the associated progressive jackpot for each of the different games. The keno game currently selected is "10 HIT PROGRESSIVE" having an associated pay table 818 showing the payout awarded for matching selected numbers against randomly selected keno numbers. Matching ten numbers out of a set of selected keno numbers triggers the progressive jackpot in this embodiment, awarding the progressive jackpot to the player.

In this embodiment, the player must pick ten numbers to match against the randomly chosen keno numbers. Typically, twenty randomly chosen keno numbers are selected for each game, but this may vary according to the host of the keno game. The player uses the selection field 850 to select the corresponding amount of numbers in order to initiate the keno game. Once an appropriate amount of number selections are made by the player, the current keno game is ready to begin, and the appropriate wager is deducted from a player account to begin game initiation. Prior to game initiation, a player may also select the button 890 to resultantly wager less by altering conditions of the keno wagering game. For example, the player may sacrifice winning possibilities and still remain eligible for the progressive jackpot in the upcoming game while playing at a lower cost. Once selected, the button 890 becomes a dialog box with the associated overlays 899 indicating the type(s) of winning combination(s) being sacrificed, a lower wagering amount, and an associated eligibility for the progressive jackpot.

Figure 8B:
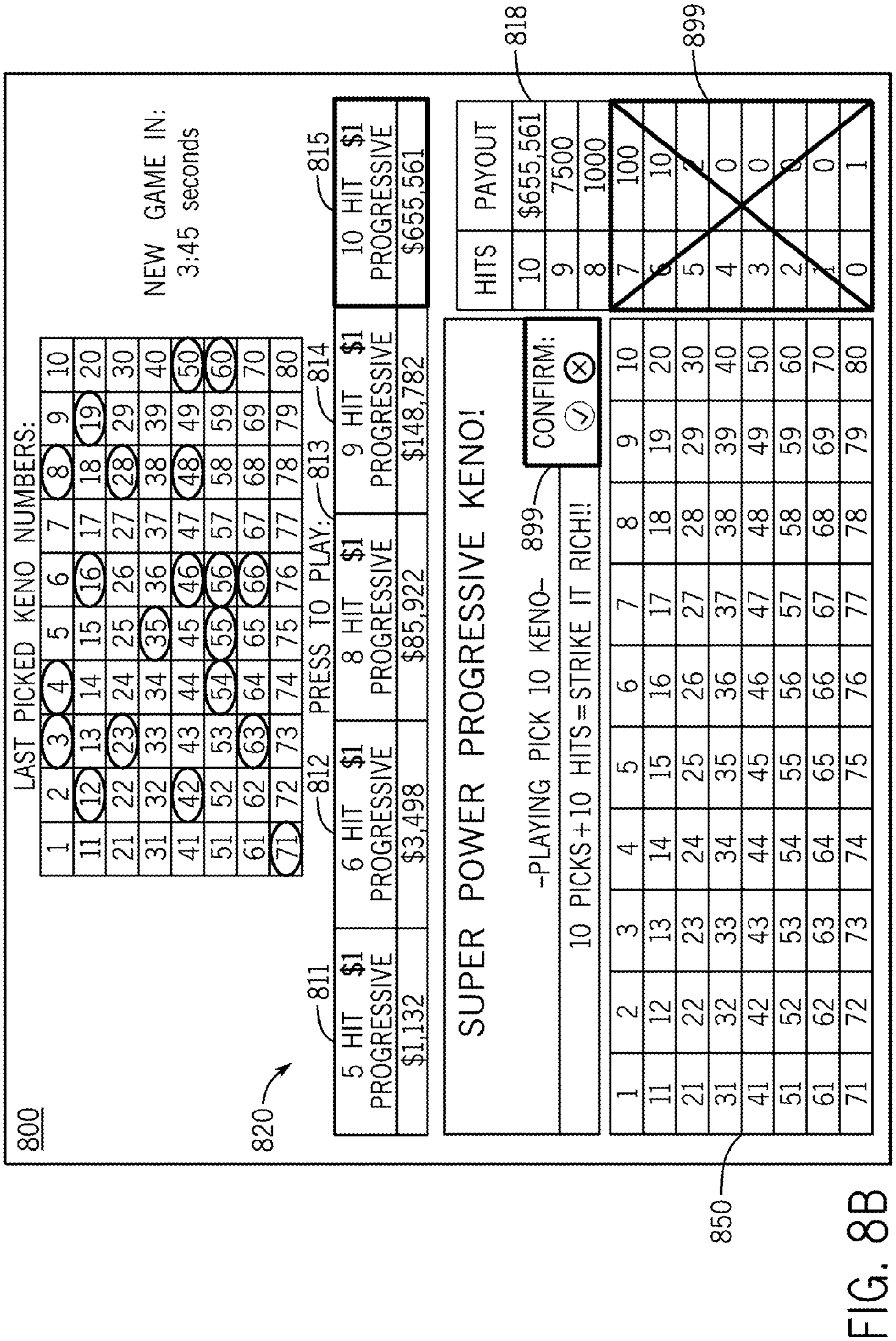

FIG. 8B shows one embodiment having a modified play field 820 which presents the player with modified keno gaming conditions. In this embodiment, the dialog box and overlays 899 indicates to the player that progressive eligibility will be maintained for a lower wager cost, but a minimum of eight numbers must be matched in order to receive a payout. These modified conditions differ from the default conditions specified in the unmodified pay table 818 in the play field 810 requiring matching five keno numbers. As a result of these modified conditions, the progressive jackpot remains available (i.e., player is eligible for the progressive jackpot), as shown in the pay table 818 of the play field 820, the wager amount is lowered, and entries of the pay table are removed. The player is informed of the modified wagering gaming conditions and prompted for confirmation using the overlays and dialog box 899.

Figure 8C:
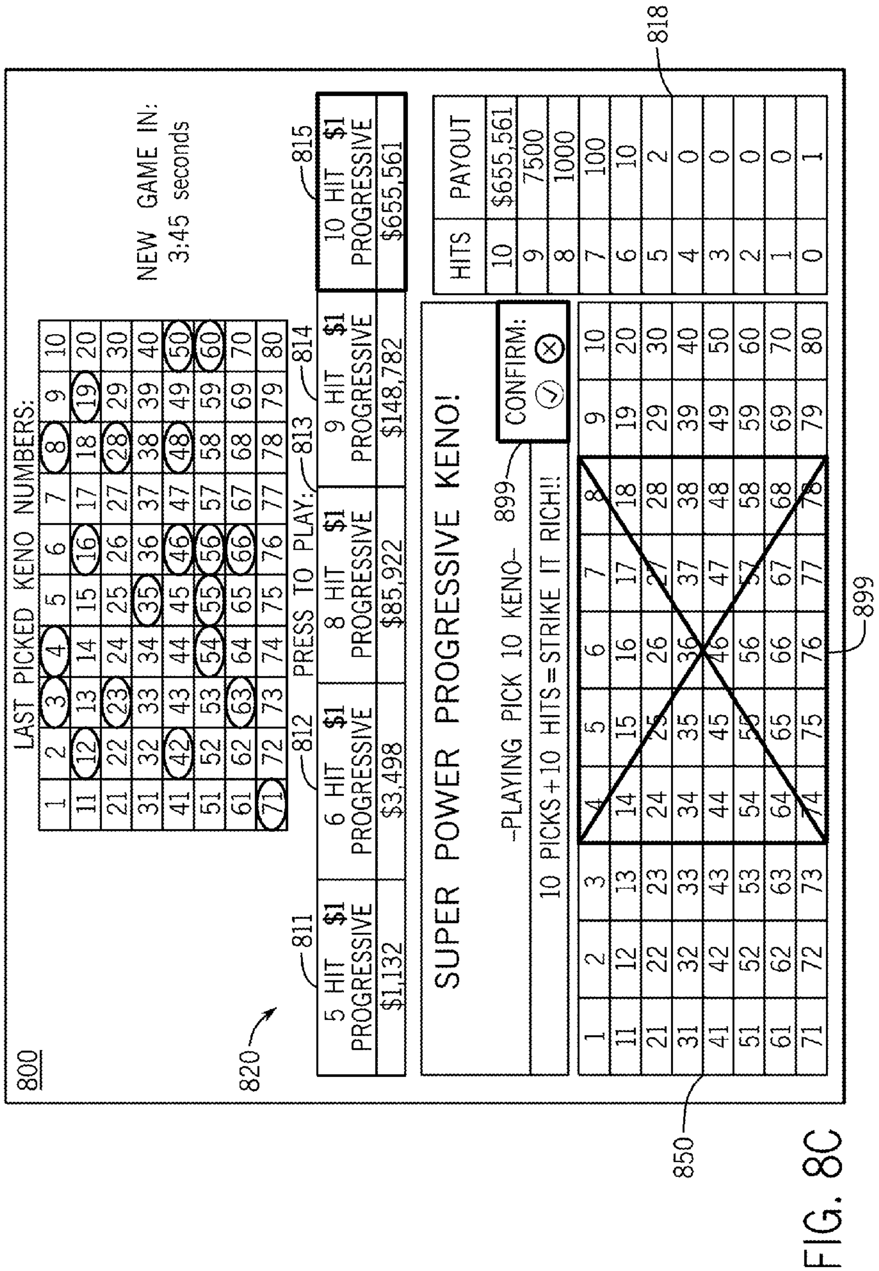

FIG. 8C shows another embodiment having a dialog box and overlays 899 indicating to the player a set of modified wagering game conditions including all numbers ending in four through eight will not be available for selection by the player when the keno game is initiated. If these modified conditions are confirmed, the player may not pick any of these crossed-out numbers during number selection, and so, the player will not be able to match any of these removed numbers against the set of selected keno numbers. In this embodiment, the player wagers less for the game, and the pay table remains unchanged, but the numbers the player may select are limited in exchange for maintaining eligibility of the progressive jackpot.

Figure 8D:
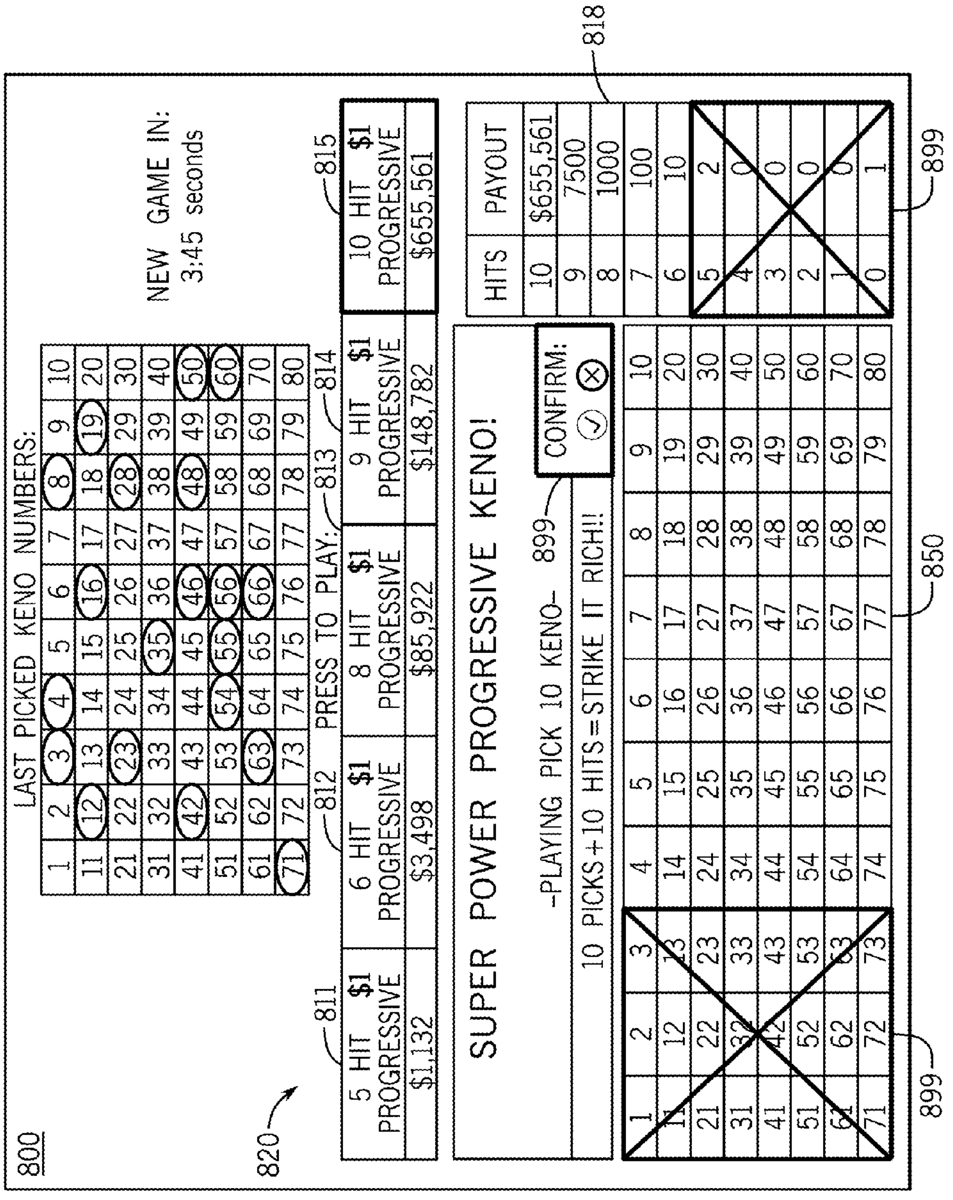

FIG. 8D shows yet another embodiment having a dialog box and overlays 899 indicating to the player that all numbers ending in one through three will not be available for selection by the player when the keno game is initiated, in addition to removing payout wins from the pay table matching five numbers or less with the chosen keno numbers. In this embodiment, if selected and confirmed, the player wagers less for the game, and both the pay table and numbers for selection are modified for the wagering game. As above, the progressive jackpot remains available as shown in the pay table 818 of the play field 820, and eligibility for the progressive jackpot remains valid during the next keno game when these modified conditions are selected and confirmed by the player.

Other embodiments of the invention may be implemented in lottery type games. Lottery games randomly select a fixed set of numbers in a given range which are compared to numbers a player is required to select while participating in the lottery game. For example, in one lottery type game, six numbers are drawn from the values one to fifty-four. Players purchase tickets for a wagering amount having six numbers recorded thereon, selectively or randomly chosen. After the lottery numbers are chosen, smaller prizes (i.e., other progressive jackpots) may be awarded for matching less than all six numbers, but the largest progressive jackpot is awarded only when all six randomly selected numbers are matched to the numbers on the player's ticket. This type of wagering gaming framework enables a player to wager less for a single ticket, sacrifice winning combinations, and maintain eligibility to win one or more of the other progressive jackpots. Alternatively, eligibility in one or more of the progressive jackpots may be sacrificed to wager less per ticket and remain eligible for one or more of the other progressive jackpots. Other embodiments include modified wagering gaming conditions which may include a reduction of progressive jackpot payouts for lower amounts of number matches (as outlined above for keno), a reduction of the amount of one or more progressive jackpots when triggered, a reduction of all progressive jackpot pay outs (by a predetermined ratio), eligibility for only a subset of the progressive jackpots, and/or removal or prohibition of specific number range(s) on a player tickets.

Figure 9A:
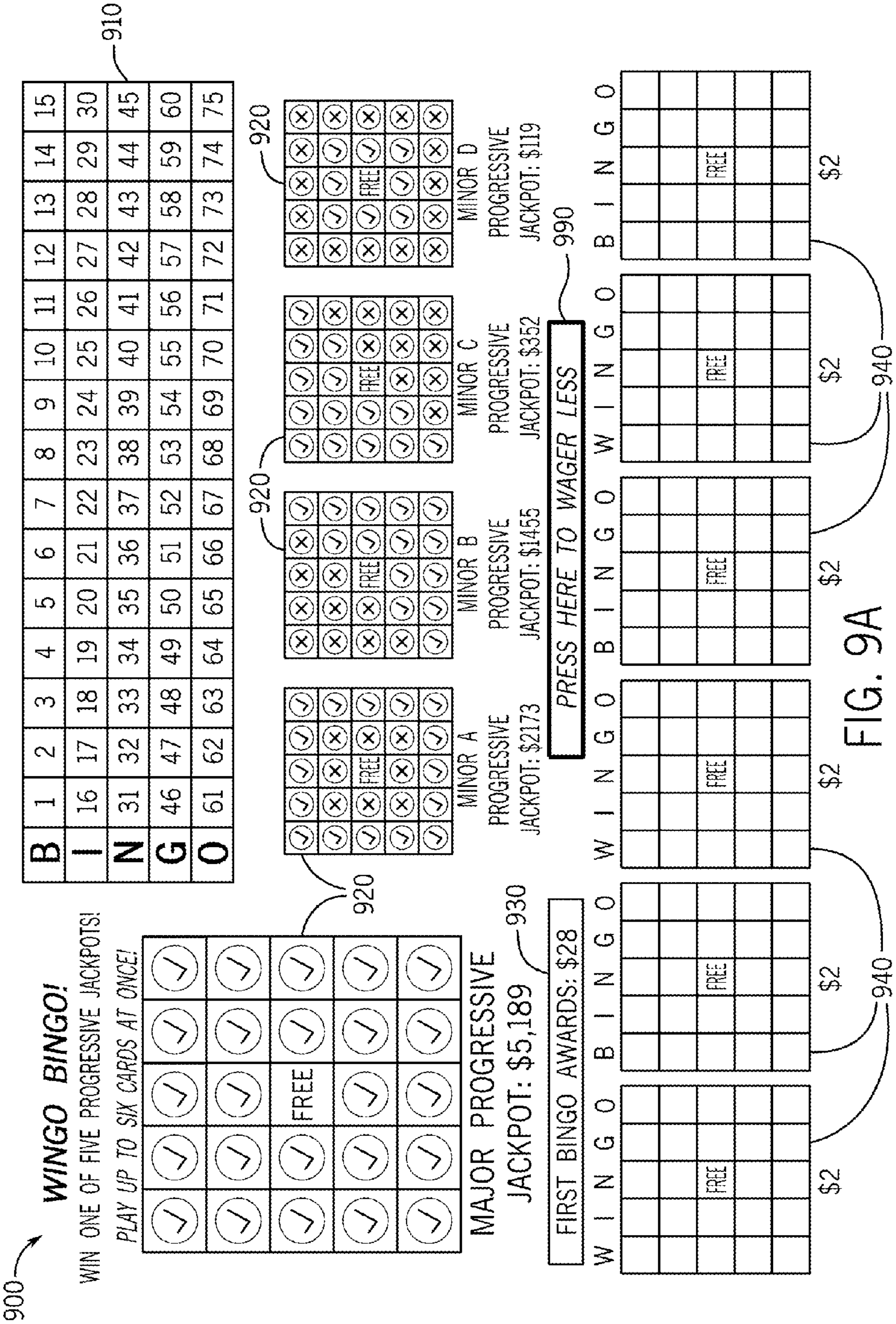
FIGS. 9A-9B are depictions of a video BINGO wagering game performing assignment of progressive jackpot eligibility in accordance with one embodiment of the invention.

Referring now to FIG. 9A, another embodiment depicting a video BINGO game having multiple progressive BINGO jackpots is shown. The multiple progressive BINGO graphical user interface 900 is shown having a BINGO drawn ball section 910, a progressive jackpot trigger pay tables 920, a BINGO win meter 930, a player BINGO cards 940, and a game condition modification button 990. The BINGO drawn ball section 910 reflects the numbers of BINGO balls as they are drawn during each game. The progressive jackpot trigger pay tables 920 show the five distinct patterns of BINGO marks on a BINGO card which will trigger awarding each of the five progressive jackpots. The BINGO win meter 930 shows the amount awarded to a player having the first BINGO in a round, and generally increases as more players join the game. The player BINGO cards 940 are shown blank, but when gaming conditions are confirmed and a wagering amount is charged for each of the active card(s), the BINGO game officially begins and the active cards will populate with numbers to conduct the BINGO game.

Figure 9B:
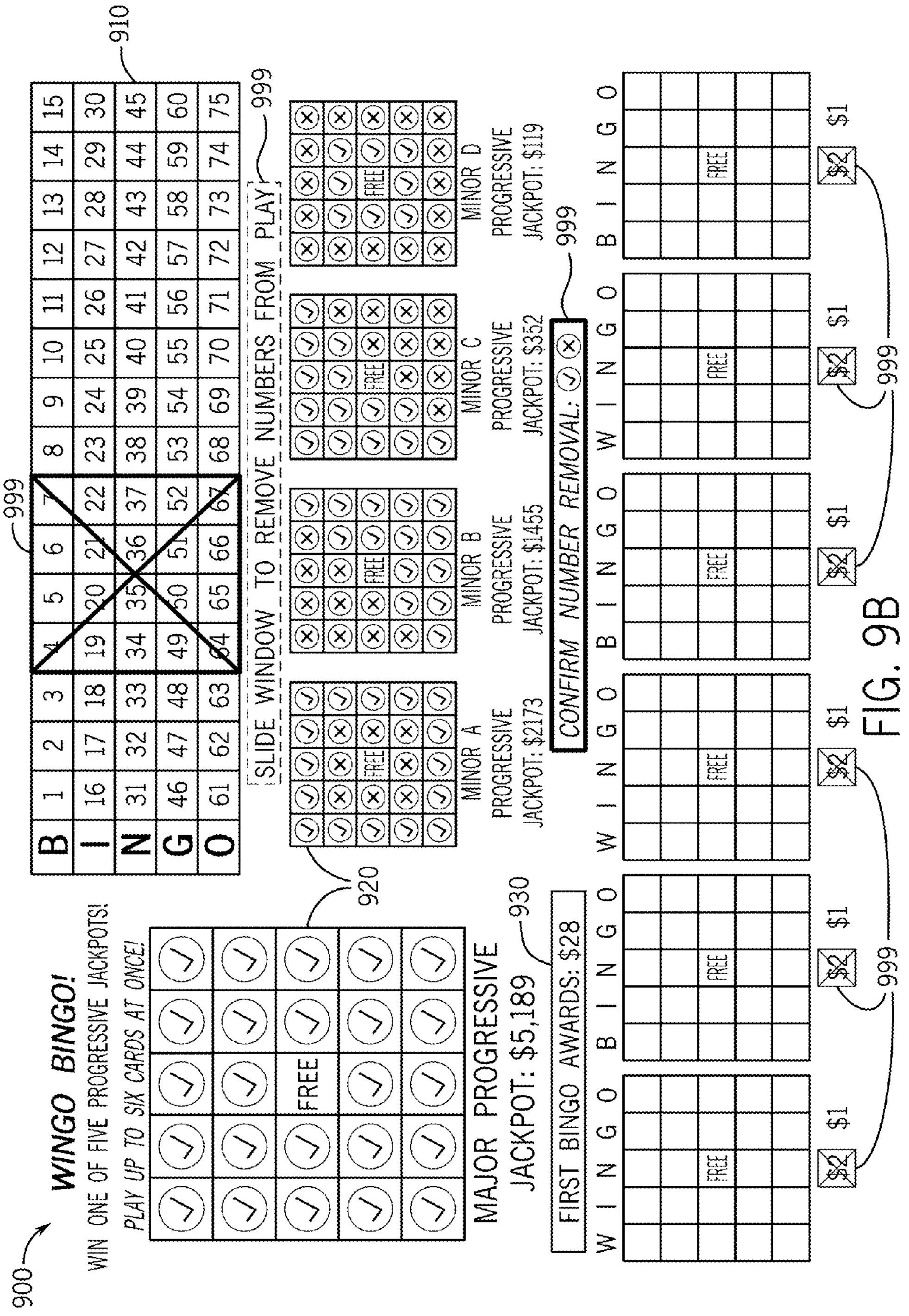

The game condition modification button 990 activates one embodiment of the invention, giving the player an opportunity to modify the gaming conditions by sacrificing winning combinations (e.g., remove a block of numbers from the player BINGO cards 940) to maintain progressive jackpot eligibility and a set of the lower cost player BINGO cards 940 (shown in FIG. 9B). The overlays and dialog boxes 999 enable the player to modify the gaming conditions by specifying which block of numbers will be removed from the player BINGO cards 940 to maintain progressive jackpot eligibility, in addition to a lower cost wager. The overlays and dialog boxes 999 reflect the amount of wager and effect of the modified winning combination, and the player is prompted for confirmation of the (modified) gaming conditions. The player may further be prompted for a number of active BINGO card(s) in play and actual initiation of participation in the BINGO game.

It is noted that while specific examples of winning combinations are provided, a variety of alternatives are possible without departing from the overall spirit and scope of the invention. For example, removal of particular winning BINGO lines or patterns may be removed from one or more player BINGO cards 940, along with a reduced wagering amount and assigned eligibility for one or more progressive jackpots. Further, removal of the center FREE space (i.e., replaced with a number), blank spaces on the player BINGO cards 940, set of restricted winning combination lines on one or more of the player BINGO cards 940, and/or random selection of any or all of the preceding may be used to modify gaming conditions and corresponding eligibility for winning one or more progressive jackpots. In one embodiment, modified gaming conditions may include entire columns or rows of entries on the player BINGO card(s) 940 being removed or presented without numbers. In another embodiment, modified gaming conditions may include manipulation of the progressive jackpot trigger, like those shown in the pay tables 920. In another embodiment, modified gaming conditions may include progressive jackpot triggering requiring one or more winning BINGO rows or columns present on a particular number of BINGO cards, or a player may have an option to forego one or more "first" BINGO wins (e.g., being the first player to call BINGO for a game or set of cards) while remaining eligible for one more progressive jackpots and paying a reduced wagering amount for one or more BINGO cards. It is noted a number of BINGO cards having no matching numbers (after a predetermined number of draws) may also be part of a progressive trigger, a reduced winning combination payout, or both, and may be incorporated into a set of modified gaming conditions. In yet another embodiment, modified gaming conditions may include a player selectively foregoing eligibility of the highest progressive jackpot, or a set of progressive jackpots, in addition to a lower wager amount and eligibility in one or more other progressive jackpots. Any and all of these various embodiments and obvious variations thereof is well within the spirit and scope of the present invention.

Another embodiment of the invention includes a modified game of "progressive jackpot" roulette offering a progressive jackpot. A roulette progressive jackpot may be maintained and funded in a number of different manners. For example, each time a player plays a game of roulette, a portion of the wager goes toward the progressive jackpot or the player is prompted to contribute an extra wager to gain eligibility for triggering the progressive jackpot. During each round of an ongoing roulette game, the randomly selected roulette number (e.g., by a ball landing in a section of the roulette wheel) is selected and recorded. During an upcoming round which includes the player's next consecutive wager, if the same number is again recorded, the player may be awarded a small bonus amount. As an example, this small bonus reward may be five credits for each credit of the average wager of the two spins. The player may or may not be required to have wagered on the selected number specifically, but is generally required to have wagered during this second roulette round. If the same number is again selected (three times in a row) in the next roulette spin that the player wagers on, another bonus amount may be awarded to the player, for example, fifty credits for each credit of the average wager of the last three spins. If the same number is again selected in the next roulette spin that the player wagers on (four times in a row), another amount may be awarded to the player, for example, five-hundred credits for each credit of the average wager of the last four spins. When a number hits on five consecutive spins for a wagering player, this triggers the roulette progressive jackpot.

In this embodiment, there a number of ways a player could elect to maintain eligibility to a progressive jackpot while wagering less than a "maximum" or "minimally required" amount. For instance, the player may forego any or all winning combinations of the "main" roulette game (i.e., all payouts) in exchange for maintaining progressive jackpot eligibility by wagering a lesser amount (for example, enough to cover the progressive contribution). Alternatively, a player may forego payment on a subset of winning combinations of the roulette game (i.e., ranges of numbers), in exchange for wagering less and remaining eligible for the progressive jackpot. Alternatively, a player may select lower return ratios for winning combinations during the roulette game in exchange for a lower wager and continued progressive jackpot eligibility. A player may also be given a choice for a specific level (amount) of wager, which automatically removes winning combinations or payout ratios, and provides eligibility for the progressive jackpot trigger. Another embodiment includes the selective eligibility for lesser progressive jackpots while foregoing eligibility in larger progressive jackpot(s).

All of the preceding various embodiments are within the spirit and scope of the present invention, and serve to exhibit the relationship of three specific variables which impact the overall gaming mechanic and experience: the wager amount, the pay table, and the presence of winning combinations of the wagering game while maintaining eligibility for a progressive jackpot.

Figure 10:
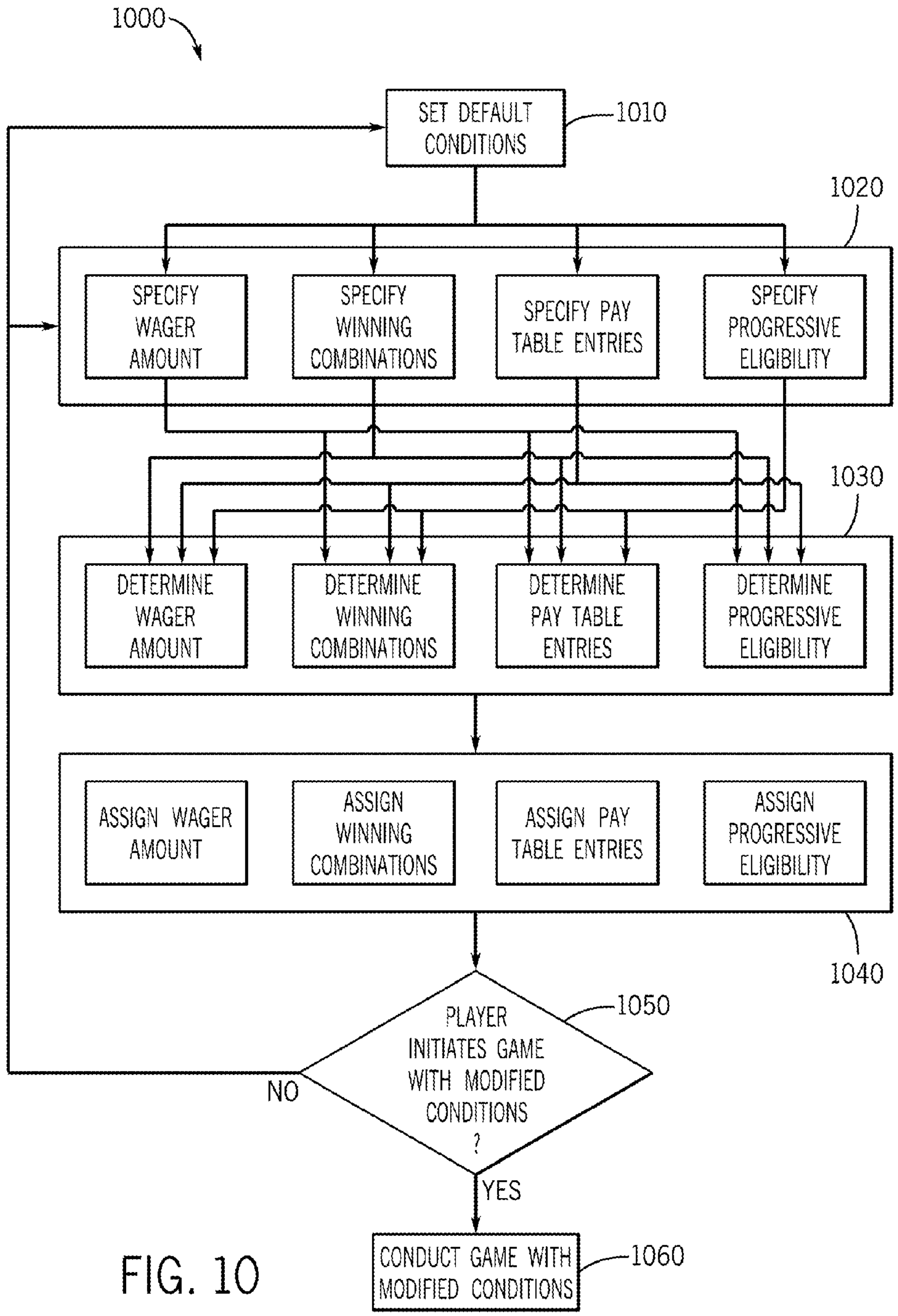
FIG. 10 is a flowchart for an algorithm that corresponds to instructions executed by a controller in accord with at least some aspects of the disclosed concepts.

Referring now to FIG. 10, described by way of example above, represents one algorithm that corresponds to at least some instructions stored and executed by the game-logic circuitry 28 in FIG. 2 to perform the above described functions associated with the disclosed concepts.

Process 1000 begins with step 1010, where a game is chosen having a set of default conditions. As outlined prior, this game may include a video slot machine, video poker, keno, BINGO, roulette, and/or any other game having at least one progressive jackpot. A variety of other games having triggering conditions for one or more progressive jackpots may also be available for the current method to be accordingly implemented. The default conditions for the defined game may include a default wager amount, a default set of winning combinations, a default set of pay table entries for each of the winning combinations, and default eligibility for each of the one or more progressive jackpot awards based upon varying levels of the wager amount for each game.

In step 1020, the player is prompted for input to change one or more of these default conditions in accordance with their selection of volatility and progressive eligibility. These changes will contribute to generate a set of determined conditions that will be used during the upcoming wagering game. Because all four of the shown conditions are interrelated, altering one or more of the conditions will likely change the remaining conditions. The mechanics of the wagering game as defined by the conditions of the game play are adjusted in such a way that an acceptable balance is achieved for both the casino and the player during that particular wagering game cycle. For example, in order for a casino to determine fiscal integrity of awarding a player progressive jackpot eligibility at a given price point below the stated minimum, some sacrifice to the pay table or set of winning combinations is required. Likewise, if a player desires progressive jackpot eligibility at a given price point below the stated minimum, the casino must alter the pay table or set of winning combinations to restore fiscal integrity. Thus, this step enables the player and the casino to "compromise" on the set of conditions which will be used during game play, which are acceptable to both. The player is allowed to selectively change some aspects of the game mechanics to retain eligibility for one or more progressives while wager amount decreases.

For instance, if a player selects a specific wager price point below a given threshold granting eligibility to one or more progressive jackpots, and a desired set of progressive eligibilities, the winning combinations available to the player and the pay table (payout for each of the winning combinations) may be altered accordingly to compensate for the shift in award probability and the lower wagering cost. However, if a player selects use a different pay table, the amount of wager and/or progressive jackpot eligibility may further change to compensate for the shift in award probability. Thus, the set of conditions for the upcoming game play must be modified to compensate for changes to the default conditions.

As an example, one or more winning combinations may be explicitly removed from the full set of winning combinations of the wagering game as a result of a lowered wager and sustained eligibility for an upcoming game cycle. Winning pay lines or specific combinations may be removed from a video slot machine, or numbers or patterns removed from one or more BINGO cards, as detailed prior.

In step 1030, the values for all such upcoming gaming conditions are preliminarily determined. For instance, this may include reducing the entire pay table by a given ratio and price of wager in exchange for eligibility for one or more progressive jackpots, or sacrificing pay table entries in exchange for a lower wager amount and maintained eligibility for one or more progressive jackpots. Alternatively, the use of a very extensive and highly detailed algorithm may be used to ensure that both the casino and the player understand the mechanics (and resulting conditions) of the new game. This may include determining a required expected value for the wagering game mathematically and comparison to predefined values in regions where regulation dictates such a requirement. The complexity of the algorithm used to establish the conditions for the upcoming wagering game is highly variable. Additionally, the wagering game may further include a number of sets of predetermined conditions which are approved by the casino, chosen by selection by a player (as previously detailed). For example, in exchange for a reduced wager amount, eligibility for one or more progressive jackpots is specifically assigned, and the pay table is modified in a given way. This may include assigning eligibility to a player for some, but not all, of the currently available progressive jackpots.

In step 1040, once the conditions of the wagering game are determined, the conditions are assigned to prelude initiation of a gaming cycle. In the current embodiment, the (reduced) wager amount is assigned, the set of corresponding winning combinations are assigned, the associated pay table (pay outs for each of the winning combinations) (which may be zero) is assigned, and a corresponding eligibility for each of the progressive jackpots is assigned.

In step 1050, if the player does not initiate the wagering game using the modified conditions, and further modifications of the gaming conditions are desired, flow of the process may return to step 1010 (restoring default conditions) or 1020 (specifying changes to conditions). This enables the player to make different selections in regard to the desired conditions which will define the mechanic for the upcoming wagering game.

When the wagering game is initiated by the player having the assigned conditions, a wagering game cycle is conducted in step 1060 using the assigned conditions. This may include a player account being deducted an amount corresponding to the wager, an outcome of the game being determined and compared against the set of winning combinations, a payout for any wins in accordance with the pay table, and awarding of one or more progressive jackpots upon triggering such an event.

Thus, a methodology for providing wagering game mechanics which include a combination of a given wagering amount, winning combination entries in a pay table for the wagering game, associated payout amounts of the pay table, and selective eligibility in one or more progressive jackpots is selected by a player of the wagering game, where eligibility would not normally be granted for the given wagering amount using the default pay table of the wagering game. This enhances the experience of a player of a wagering game by providing selective control of progressive jackpot eligibility, wagering amount, and overall volatility of the wagering game, decreasing the rate of player bankroll decline while maintaining potential for large winnings.

Each of these embodiments and obvious variations thereof is contemplated as falling within the spirit and scope of the claimed invention, which is set forth in the following claims. Moreover, the present concepts expressly include any and all combinations and subcombinations of the preceeding elements and aspects.

What is claimed is:

1. A gaming system configured to provide eligibility for a progressive jackpot in a wagering game, the wagering game having a default minimum wager amount that qualifies a player for the progressive jackpot and having a plurality of payout possibilities, the system comprising:

one or more input devices;

one or more display devices;

game-logic circuitry comprising one or more processors, one or more memory devices, and one or more random number generators (RNG), the one or more memory devices storing instructions that, when executed by the one or more processors, cause the game-logic circuitry to:

receive, via at least one of the one or more input devices, a request from the player to establish a modified minimum wager amount, the modified minimum wager amount being less than the default minimum wager amount, the modified minimum wager amount being requested to allow the player to be eligible for the progressive jackpot;

reduce, via at least one of the one or more processors, one or more payout possibilities of the plurality of payout possibilities of the wagering game;

in response to reducing the one or more payout possibilities, designate, via at least one of the one or more processors, the modified minimum wager amount as qualifying for the progressive jackpot in the wagering game;

receive, via at least one of the one or more input devices, an input from the player indicative of a wager of the modified minimum wager amount to initiate the wagering game; and conduct, via at least one of the one or more processors, the wagering game by polling at least one of the one or more RNGs to obtain a random parameter for use in determining a wagering game outcome with the player being qualified for the progressive jackpot at the modified minimum wager amount.

2. The gaming system of claim 1, wherein the player input specifies how the one or more payout possibilities are reduced.

3. The gaming system of claim 1, wherein the player input specifies which of the one or more payout possibilities are reduced.

4. The gaming system of claim 1, wherein the player input specifies the modified minimum wager amount chosen from a set of predetermined wager amounts.

5. The gaming system of claim 1, wherein the player input specifies removal of at least one of the one or more payout possibilities from the plurality of payout opportunities.

6. The gaming system of claim 1, wherein reducing the one or more payout possibilities includes reducing respective award amounts associated with the one or more of the plurality of payout possibilities.

7. The gaming system of claim 1, wherein reducing the one or more payout possibilities includes reducing at least one of the one or more payout possibilities by a predetermined ratio.

8. The gaming system of claim 1, wherein one of the reduced one or more payout possibilities triggers awarding the progressive jackpot.

9. A computer-implemented method in a gaming system having game-logic circuitry including one or more processors, one or more memory devices, and one or more random number generators (RNG), the gaming system being configured to conduct a wagering game having a default minimum wager amount that qualifies a player for a progressive jackpot and having a plurality of payout possibilities, the method comprising:

receiving, via at least one of one or more input devices, a request from the player to establish a modified minimum wager amount, the modified minimum wager amount being less than the default minimum wager amount, the modified minimum wager amount being requested to allow the player to be eligible for the progressive jackpot;

reducing, via at least one of the one or more processors, one or more payout possibilities of the plurality of payout possibilities of the wagering game;

in response to reducing the one or more payout possibilities, designating, via at least one of the one or more processors, the modified minimum wager amount as qualifying for the progressive jackpot in the wagering game;

receiving, via at least one of the one or more input devices, an input from the player indicative of a wager of the modified minimum wager amount to initiate the wagering game; and conducting, via at least one of the one or more processors, the wagering game by polling at least one of the one or more RNGs to obtain a random parameter for use in determining a wagering game outcome with the player being qualified for the progressive jackpot at the modified minimum wager amount.

10. The method of claim 9, wherein the player input specifies how the one or more payout possibilities are reduced.

11. The method of claim 9, wherein the player input specifies which of the one or more payout possibilities are reduced.

12. The method of claim 9, wherein the player input specifies the modified minimum wager amount chosen from a set of predetermined wager amounts.

13. The method of claim 9, wherein the player input specifies removal of at least one of the one or more payout possibilities from the plurality of payout opportunities.

14. The method of claim 9, wherein reducing the one or more payout possibilities includes reducing respective award amounts associated with the one or more of the plurality of payout possibilities.

15. The method of claim 9, wherein reducing the one or more payout possibilities includes reducing at least one of the one or more payout possibilities by a predetermined ratio.

16. The method of claim 9, wherein one of the reduced one or more payout possibilities triggers awarding the progressive jackpot.

17. The method of claim 9, further comprising, prior to receiving the request from the player, displaying, via a display device, an offer to the player to be qualified for the progressive jackpot at a wager amount that is less than the default minimum wager amount.

18. A gaming system configured to provide eligibility for a progressive jackpot in a wagering game, the system comprising:

one or more input devices;

one or more display devices;

game-logic circuitry comprising one or more processors, one or more memory devices, and one or more random number generators (RNG), the one or more memory devices storing instructions that, when executed by the one or more processors, cause the game-logic circuitry to:

display, via at least one of the one or more display devices, an initial game screen of the wagering game including a wager-modifying selector;

in response to receiving, via at least one of the one or more input devices, an input from a player indicative of a first wager amount, conduct the wagering game with the player qualifying for the progressive jackpot at the first wager amount;

in response to receiving, via the wager-modifying selector, a request from the player to wager less than the first wager amount and remain qualified for the progressive jackpot, reduce one or more payout possibilities of the wagering game, designate a modified wager amount as qualifying for the progressive jackpot in the wagering game, and conduct the wagering game by polling at least one of the one or more RNGs to obtain a random parameter for use in determining a wagering game outcome with the player being qualified for the progressive jackpot at the modified wager amount.

19. The gaming system of claim 18, wherein the request from the player includes a selection of a second wager amount from a plurality of available second wager amounts, and wherein the modified wager amount equals the second wager amount.

20. The gaming system of claim 18, wherein the request from the player includes a selection of which of the one or more payout possibilities of the wagering game will be reduced.

* * * * *